United States Patent [19]

Rossini

[11] Patent Number: 4,479,147
[45] Date of Patent: Oct. 23, 1984

[54] METHOD OF AND APPARATUS FOR FEEDING AND POSITIONING MATERIAL TO BE SCANNED

[75] Inventor: Ernest M. Rossini, Springfield, Va.

[73] Assignee: Crosfield Data Systems, Inc., Springfield, Va.

[21] Appl. No.: 384,366

[22] Filed: Jun. 2, 1982

[51] Int. Cl.³ .............................................. H04N 1/06
[52] U.S. Cl. ..................................... 358/290; 271/94; 271/103
[58] Field of Search ....................... 358/290, 256, 291; 271/3, 6, 7, 91–95, 103–104; 280/234

[56] References Cited

U.S. PATENT DOCUMENTS

| | | |
|---|---|---|
| 3,112,698 | 12/1963 | Lake . |
| 3,502,803 | 3/1970 | Bigenwald et al. ................. 358/290 |
| 3,670,646 | 6/1972 | Welch, Jr. ............................ 101/382 |
| 3,734,017 | 5/1973 | Trier et al. . |
| 3,737,575 | 6/1973 | Kominami ........................... 358/290 |
| 3,816,659 | 6/1974 | Landsman ........................... 358/290 |
| 3,991,145 | 11/1976 | Landsman ............................... 264/25 |
| 4,131,916 | 12/1978 | Landsman ........................... 358/285 |
| 4,206,482 | 6/1980 | De Lavalette et al. ............ 358/290 |
| 4,262,594 | 4/1981 | Landsman . |
| 4,334,770 | 6/1982 | Landsman . |
| 4,362,805 | 12/1982 | Landsman . |

OTHER PUBLICATIONS

Catalog Sheet for Stilson Miniature Roto Clamps (1 sheet).
Dover Air Bearings, Dover Instrument Corp., P.O. Box 100, 5 Walkup Drive, Westboro, Mass. 01581 (1 sheet).
Bulletin No. 580, Dover Instruments Corp., P.O. Box 100, 5 Walkup Drive, Westboro, Mass. 01581 (1 sheet).
"Service and Maintenance Manual" Logescan Model 2417, Laser Platemaking System FIG. 4-20+1 sheet of description.
Logescan 2417 C.U. "Service & Maintenance Manual" (Feb. 1982), pp. IV-47 thru IV-50.
Catalog sheet describing Fairchild Model T5100 series I/P and E/P Transducers (2 sheets).
Catalog sheet for M83 Series Motor/Driver produced by Compumotor Corporation, 1310 Ross Street, Petaluma, CA 94952.
Catalog sheets for Air Bearing Slides known as Pneumo-Linear Slides, manufactured by Pneumo Precision, Inc., Precision Park, Keene, N.H. 03431 (4 sheets).

Primary Examiner—John C. Martin
Assistant Examiner—Edward L. Coles
Attorney, Agent, or Firm—William D. Hall

[57] ABSTRACT

The invention provides a way of positioning the material to be scanned with respect to a mirror that both rotates and translates in order to reflect a scanning beam on the material. A sector of a cylinder has the same axis as the rotating mirror. The material to be scanned is mounted on the top of a flexible plate. The flexible plate may rest flat on a table outside of the area scanned. The flexible plate may then be pushed into the cylinder with the bottom face of the flexible plate in contact with the inner side wall of the sector of the cylinder. When the flexible plate has reached the proper position in the cylinder, the bottom face of the plate of the flexible plate is held in position against the inner wall of the sector of the cylinder by suction, so that scanning may proceed.

17 Claims, 26 Drawing Figures

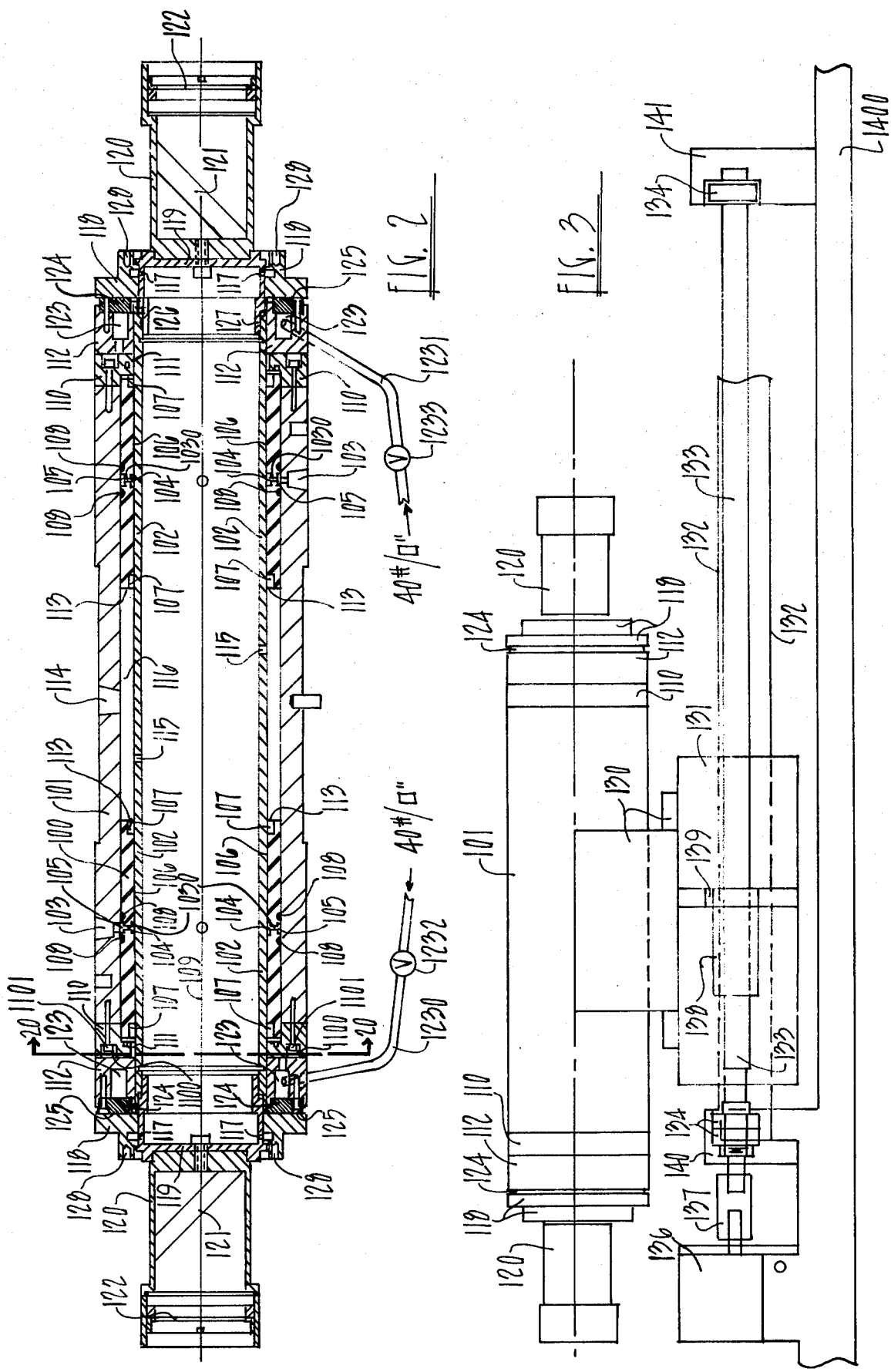

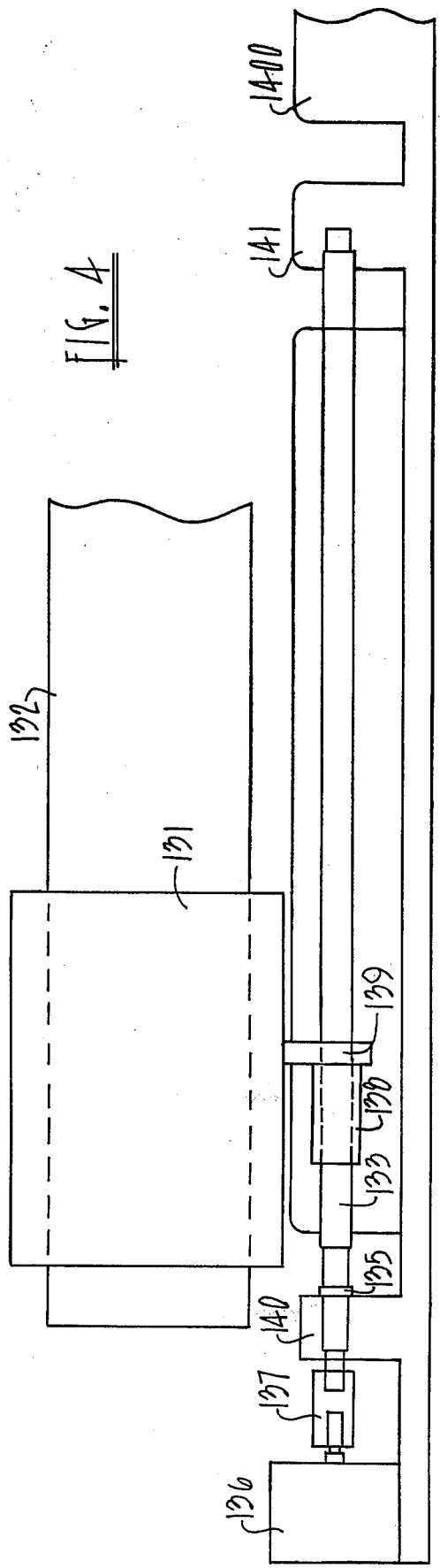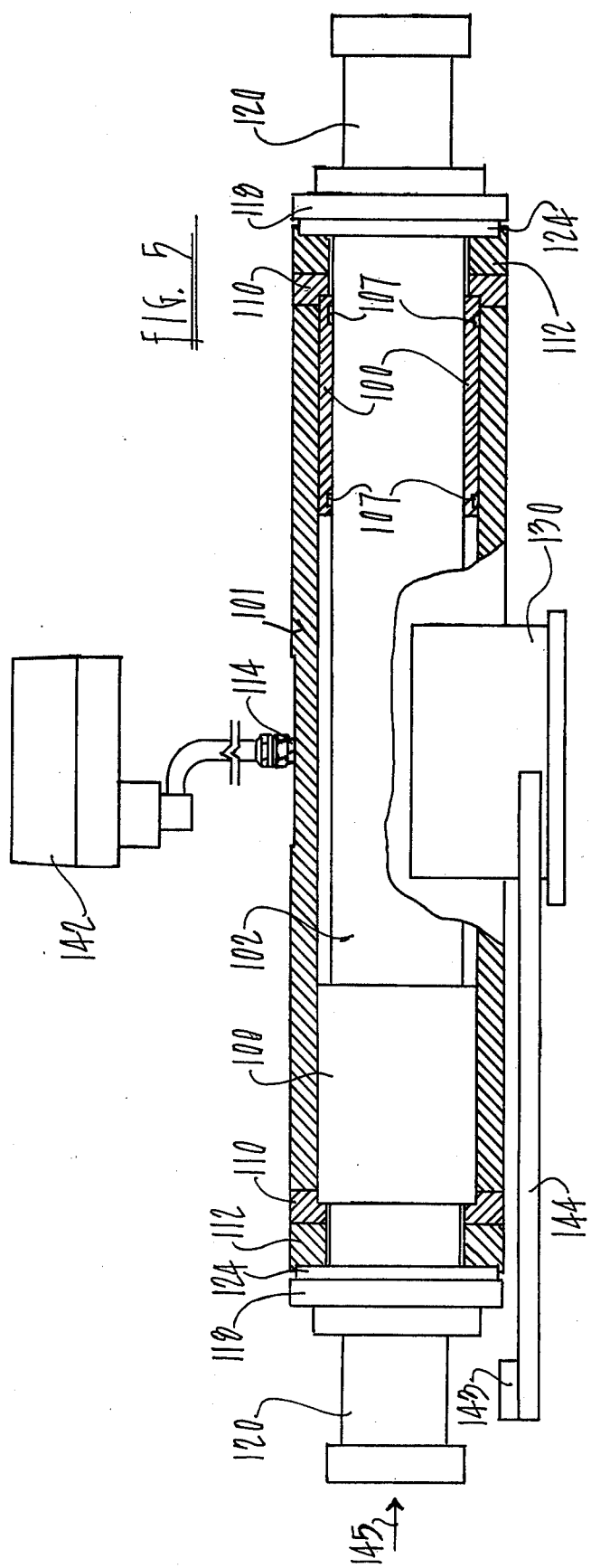

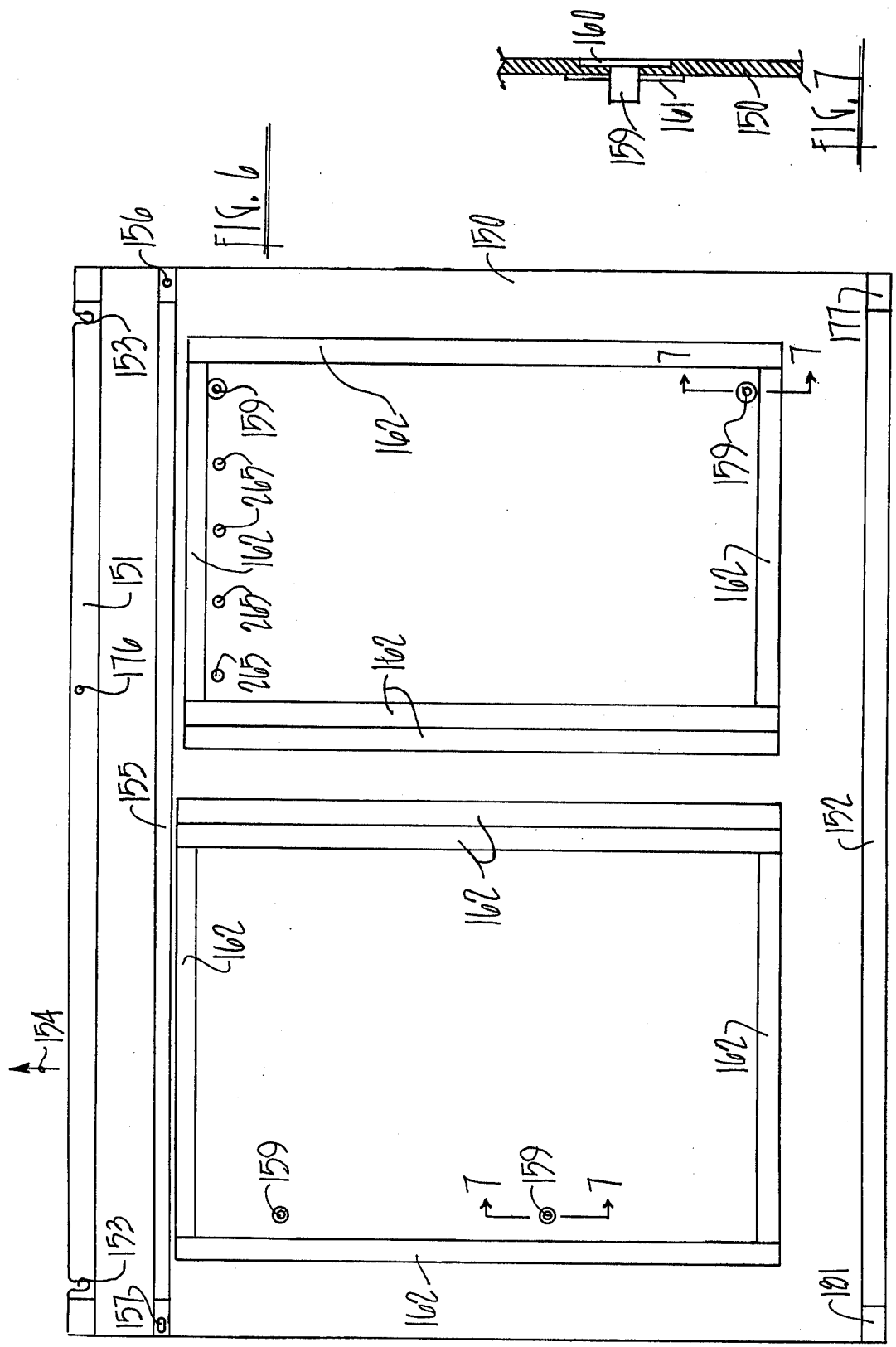

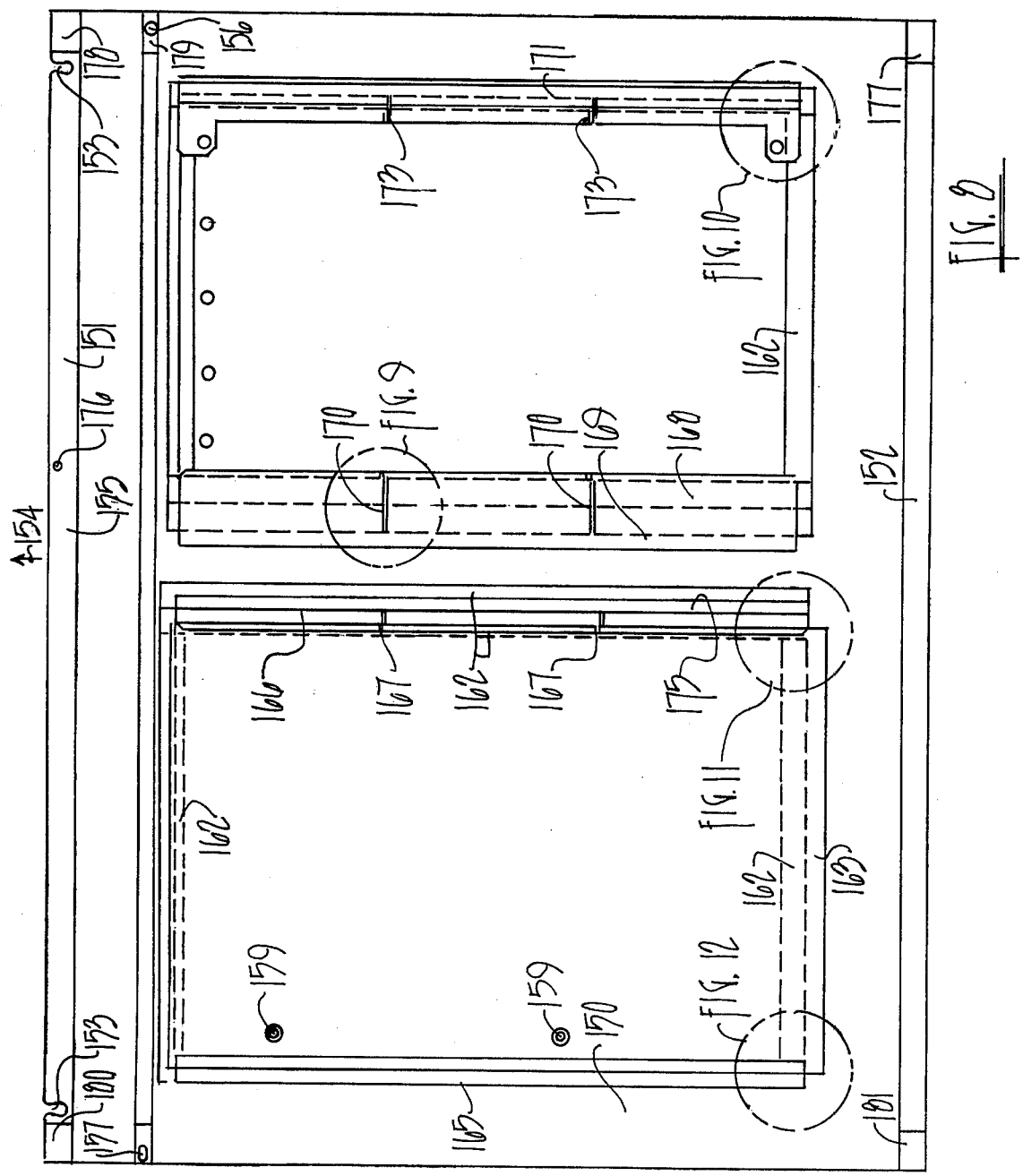

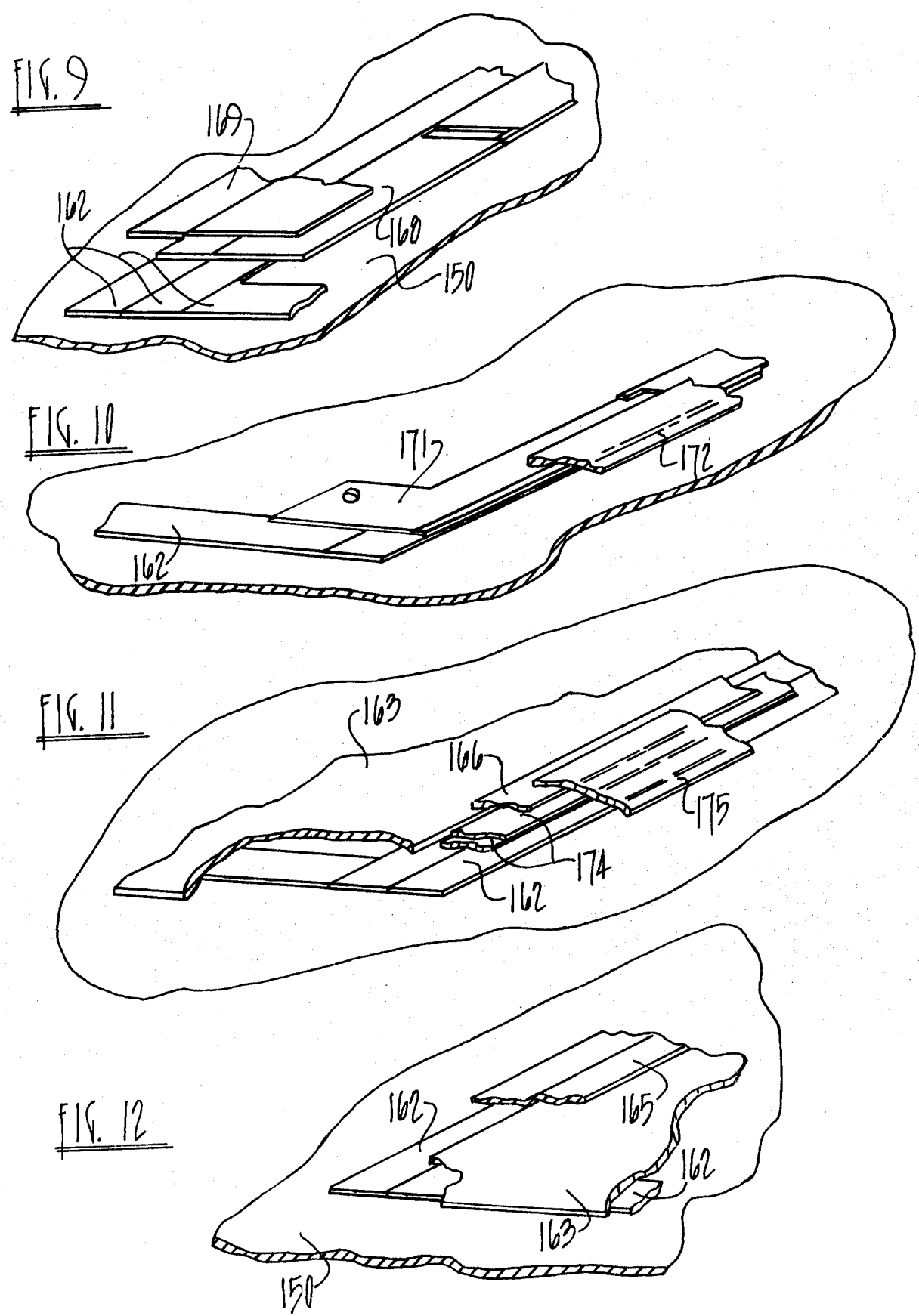

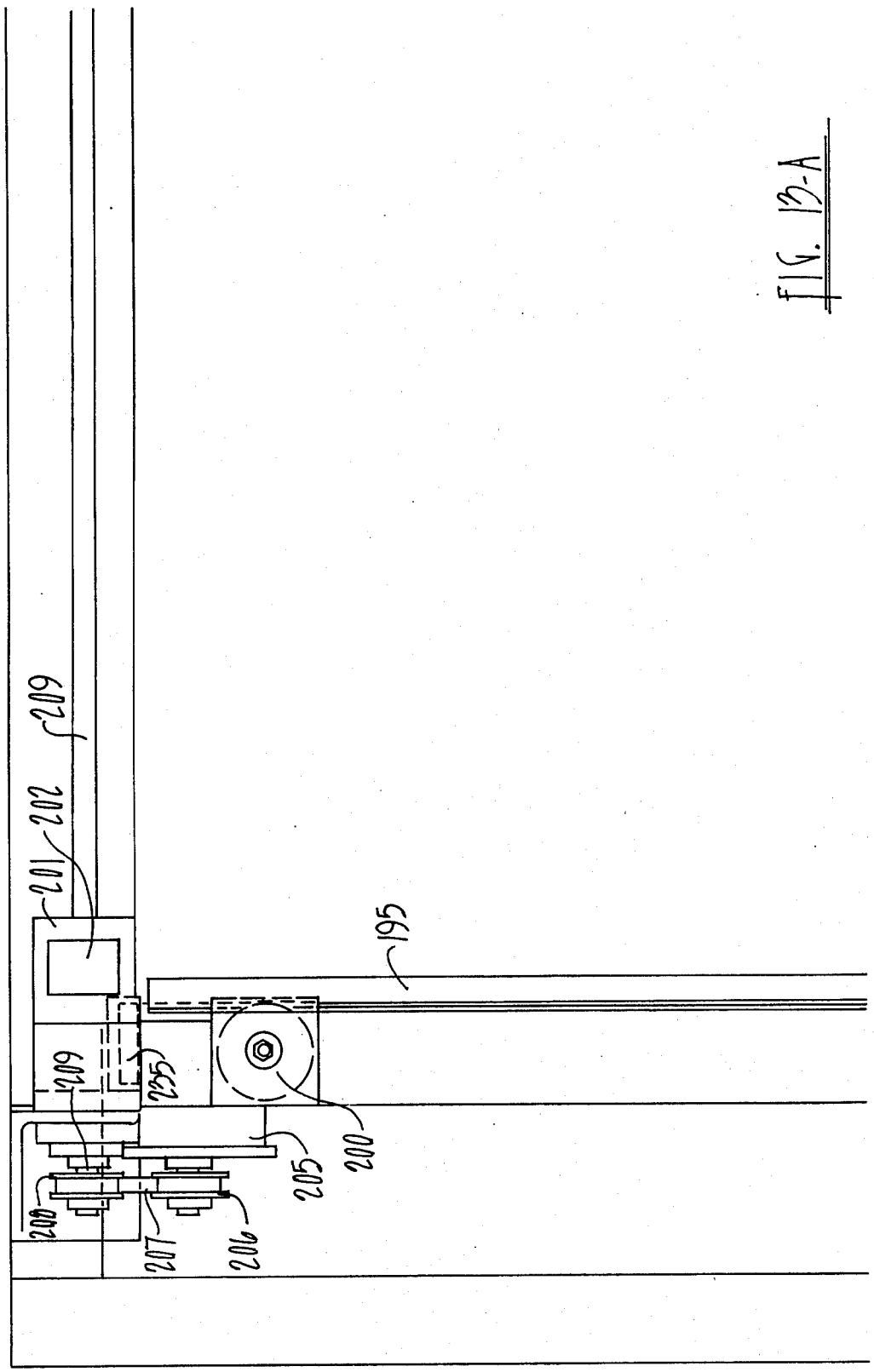

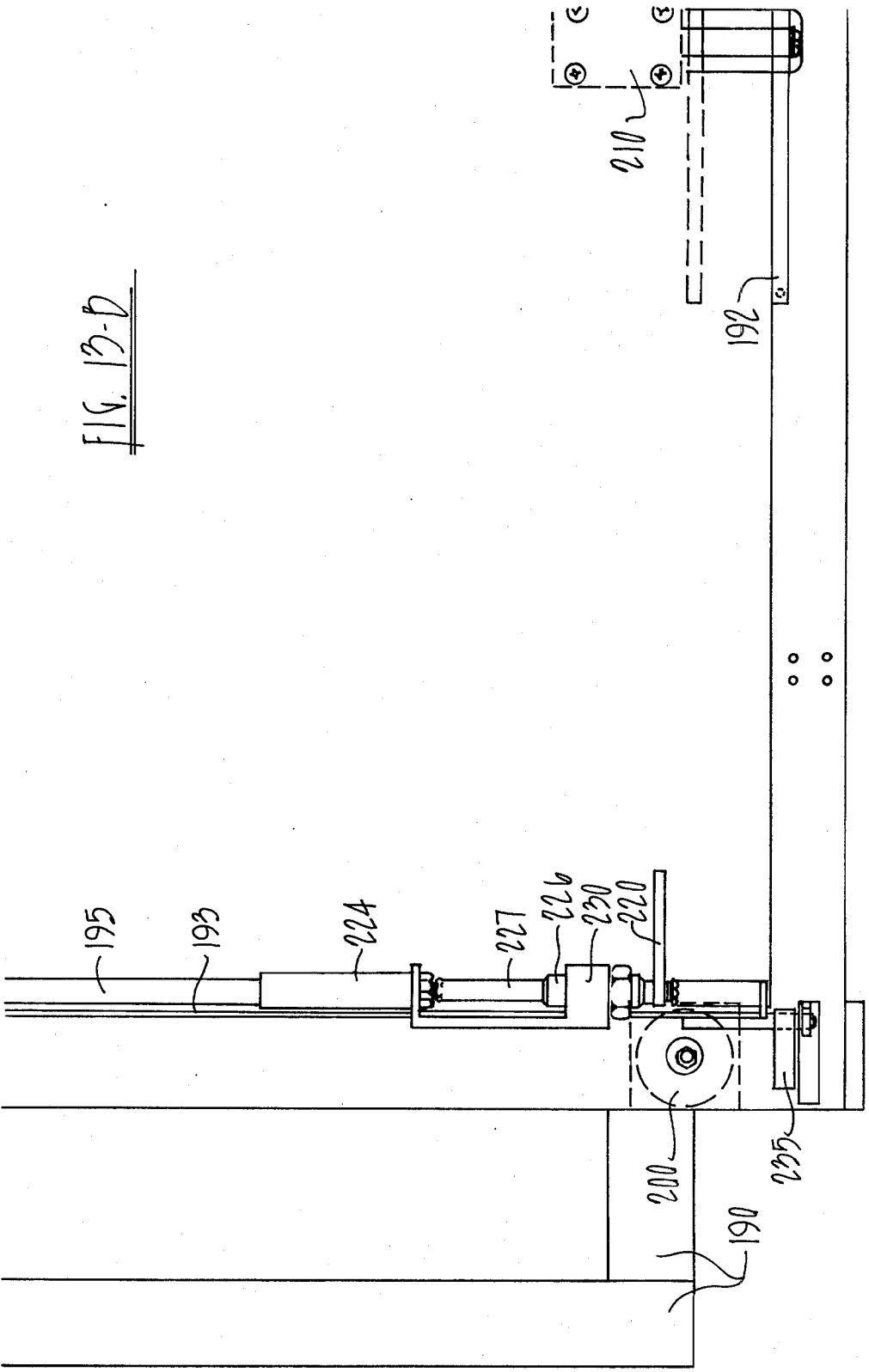

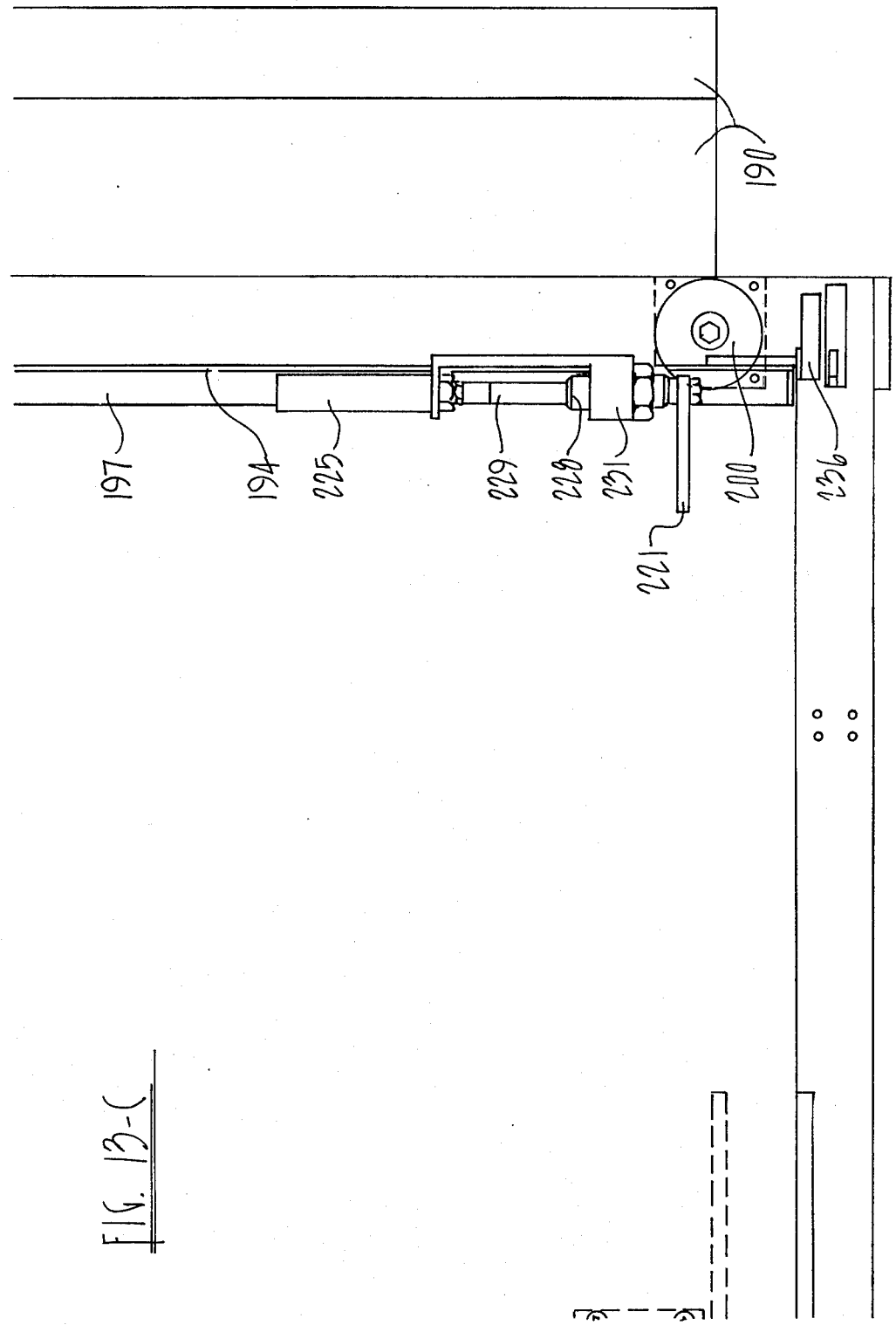
FIG. 13-C

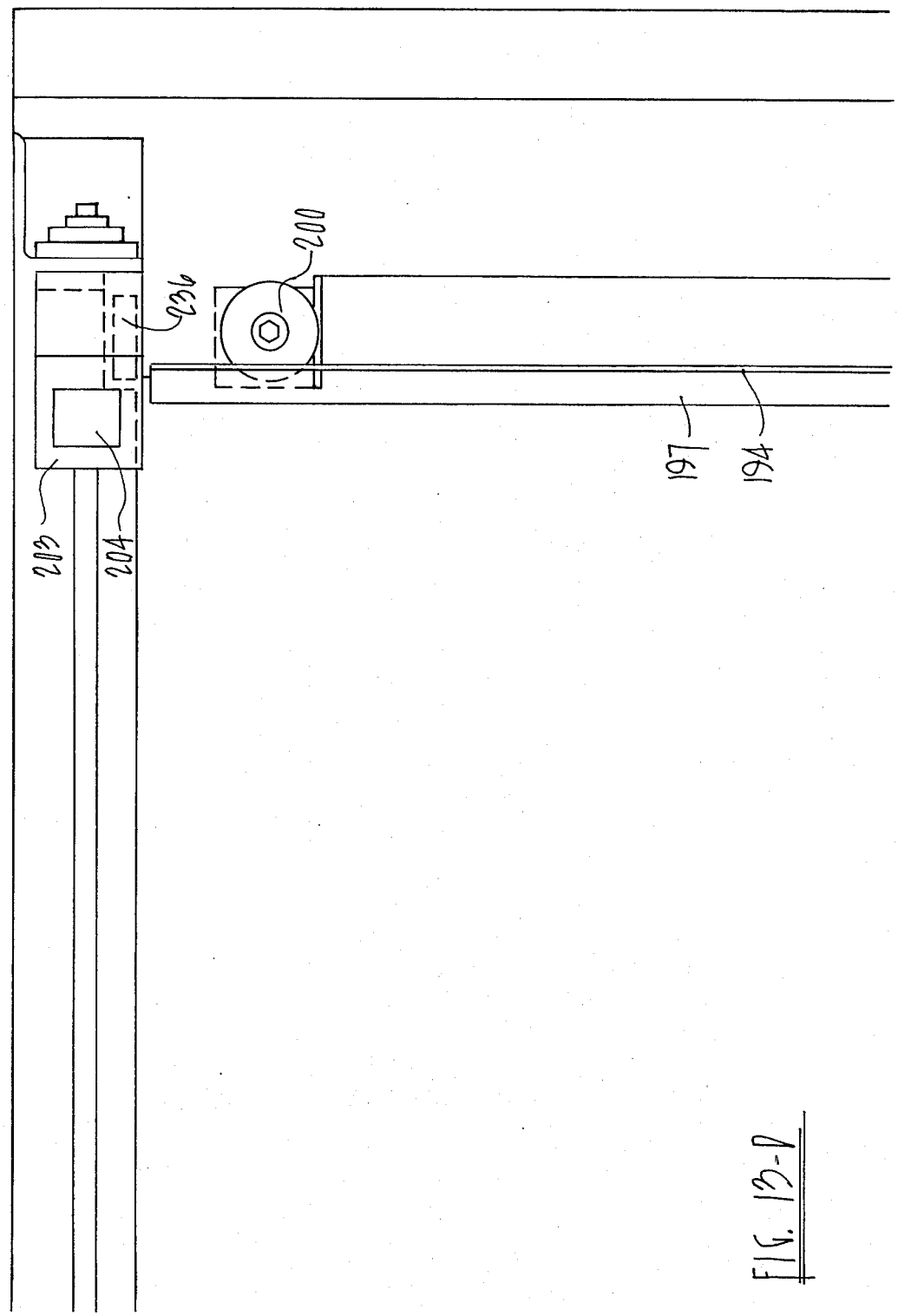

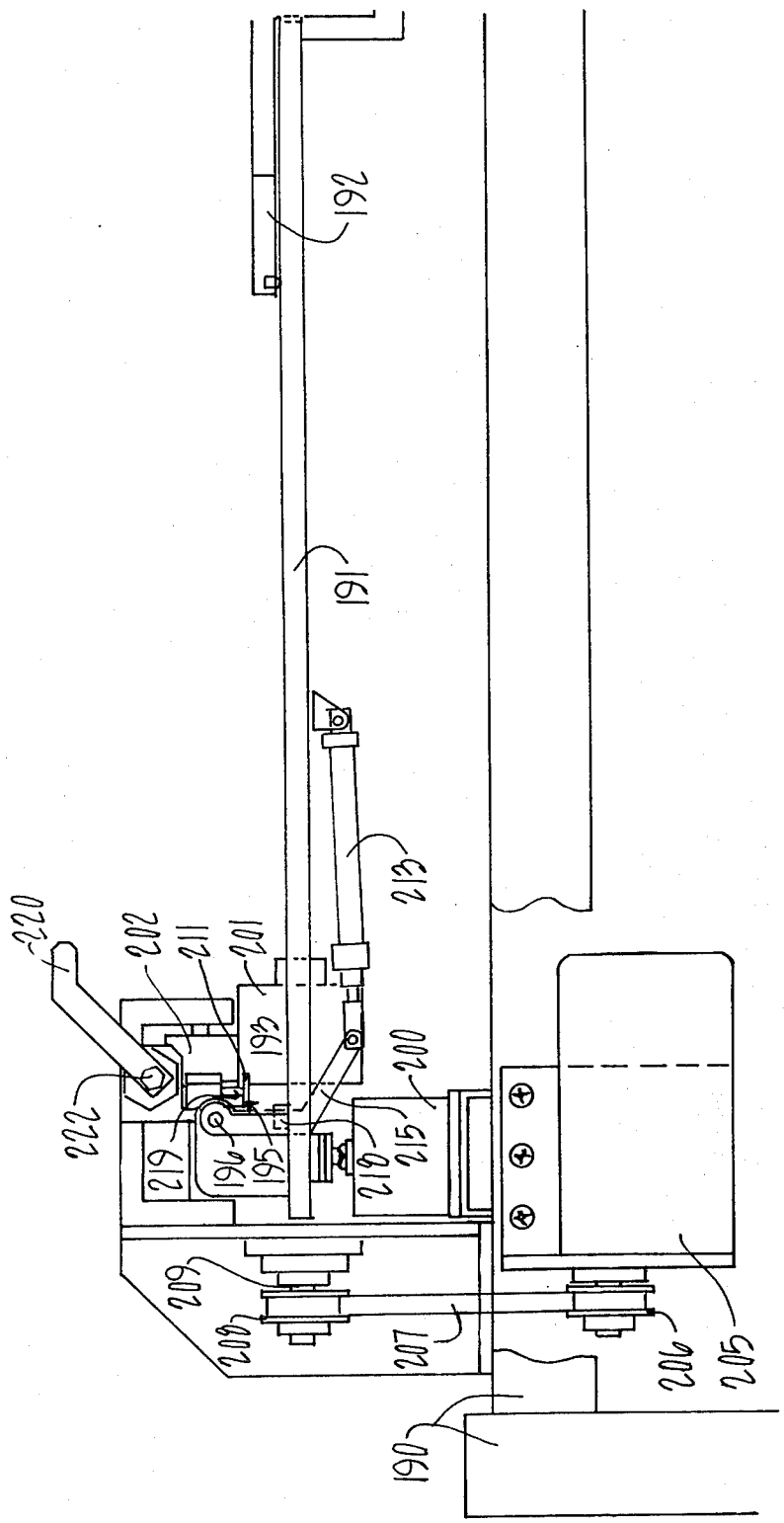

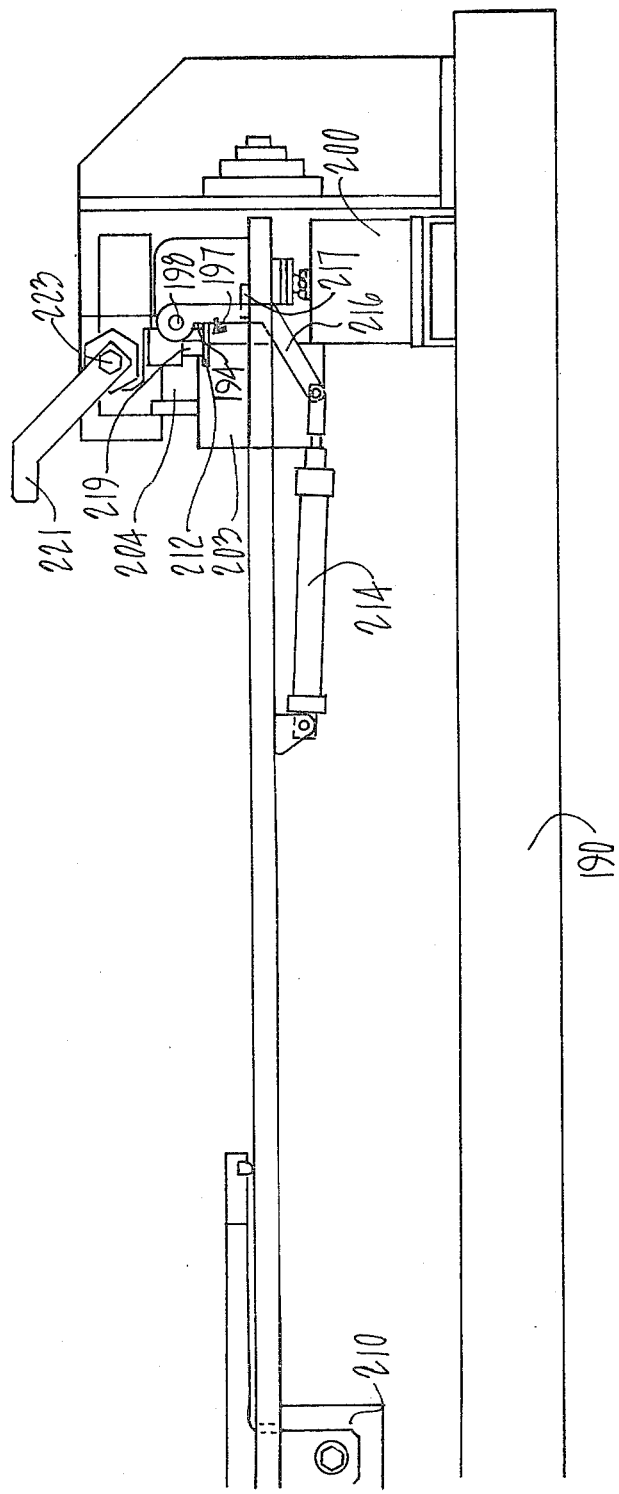
FIG. 14-D

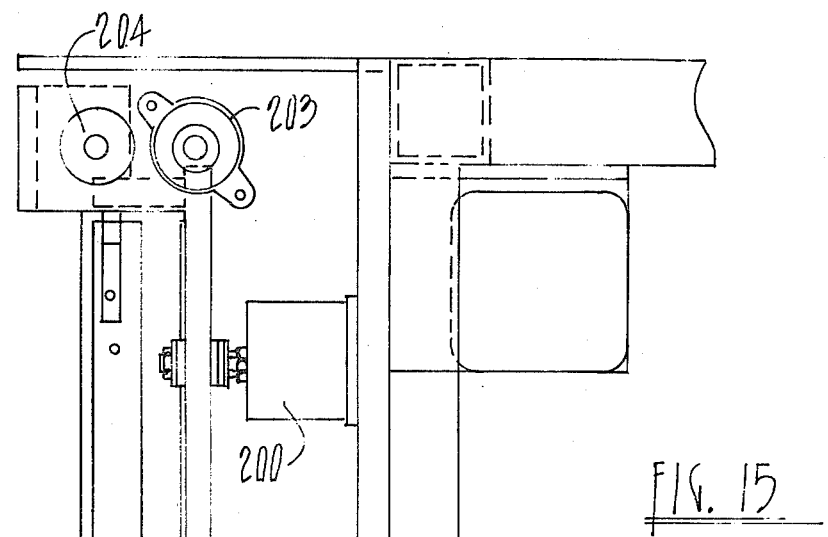
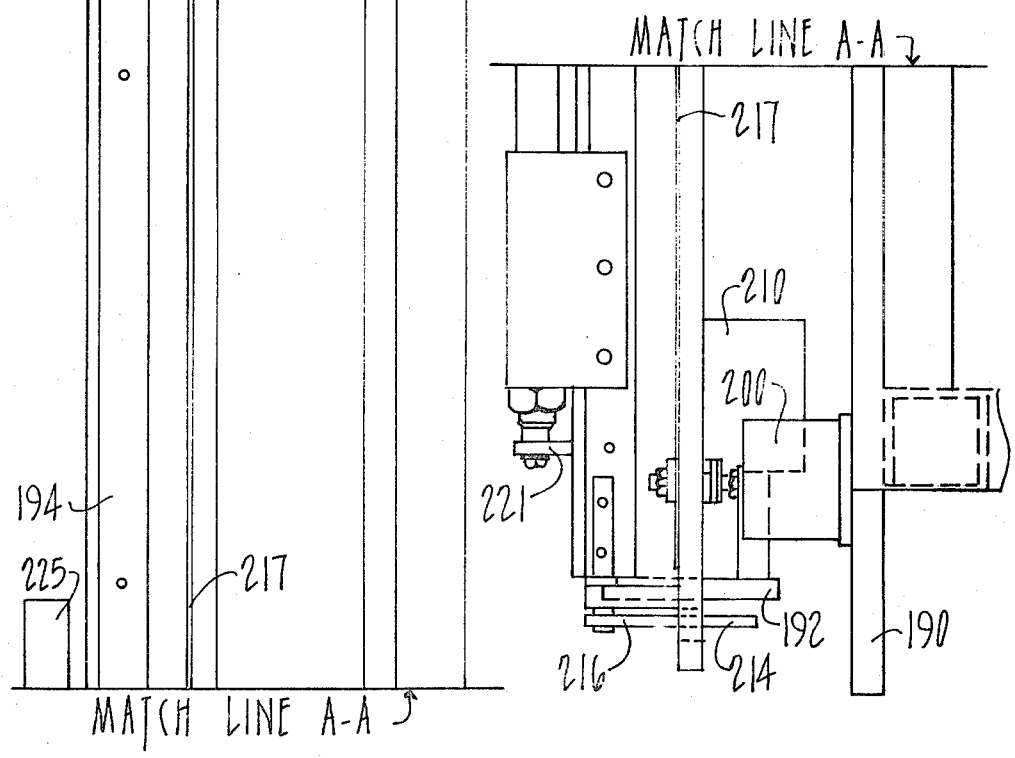
FIG. 15

METHOD OF AND APPARATUS FOR FEEDING AND POSITIONING MATERIAL TO BE SCANNED

TECHNICAL FIELD

This invention relates to the method of, and the apparatus for, moving a transport into, and out of, a scaning position. With the present invention, the scanning means both rotates and translates. Therefore, the transport, which carries the material to be scanned, must move into a curved position in order for it to be scanned.

BACKGROUND ART

A flexible transport that is normally flat but which is wrapped around two discs, before scanning begins, is illustrated in U.S. Pat. No. 4,262,594, to Robert M. Landsman, issued Apr. 21, 1981, entitled Method and Apparatus for Manipulating and Transporting Image Media.

DISCLOSURE OF INVENTION

In accordance with the present invention the flexible transport is moved from a normally flat position into a scaning system. The scanning system has a wall, the inner face of which is of generally cylindrical shape. The transport is driven from said normally flat position into the scanning system with the lower face of said transport contiguous with the inner face of said wall. The upper face of the transport carries the material to be scanned, and when, in the scanning system at least partly encircles the axis of the cylindrical inner face of the wall. A scanning device that rotates about, and translates along, said axis, scans said material.

The transport, when in the scanning system, is held against the inner face of said wall by suction, during scanning.

After scanning has been completed, the transport is driven from its position continguous with the inner face of said wall, to its normally flat position. The material to be scanned will then usually be changed, and the procedure described above repeated in order to scan the new material.

This invention has major advantages over the prior devices. One of these advantages is that the transport may be much simpler; indeed its cost maybe reduced by the use of this invention to about one-tenth the cost of the prior art transport shown in FIG. 1 of said U.S. Pat. No. 4,262,594. Another advantage is that the material to be scanned maybe more precisely positioned than was possible with the transport referred to in said prior patent. Precise positioning of the material to be scanned improves the fidelity of the scanning. In addition my invention provides a simpler and better construction as well as an improved mode of operation. Other objects and advantages of my invention will appear as this description proceeds.

RELATED APPLICATIONS

After I made the basic invention claimed in this application, others working under may direction invented certain improvements and/or inventions in equipment related to the machine to which my invention was applied. Patent applications for such improvements and/or inventions are being filed as follows:

Certain improvements in the rotary scanning system (see FIG. 2 of this application) are described and claimed in the application of Joseph J. Crane and Daniel T. Beasley, Ser. No. 383,930, filed on even date herewith, and entitled: "Scanning System Employing a Laser Beam."

Improvements in the means for rotating and laterally moving the scanning device are described and claimed in the application of Joseph J. Crane, Ser. No. 383,928, filed on even date herewith, and entitled: "Scanning Wherein the Scanning Beam Rotates and Translates." These improvements are shown in FIGS. 3 and 4 of this application.

An improved table and method, for feeding the transports to, and receiving the transports from, the scanning system are disclosed in applications of Wah Sheck, Ser. Nos. 383,927 and 383,929, filed on even date herewith and respectively entitled: "Method of Feeding Material To and Receiving it From a Scanning System," and "Apparatus for Feeding Material To and Receiving Material From a Scanning System." The improvements described and claimed in the Sheck applications are shown and described in connection with FIGS. 13 to 15 of this application.

An improved means for positioning and holding the transport in the drum is described and claimed in an application, filed on even date herewith, of Wah Sheck et al., Ser. No. 384,931, entitled: "Method Of and Apparatus for Insuring That the Transport of A Scanning System is Continguous With its Support."

BRIEF DESCRIPTION OF THE DRAWINGS

FIG. 2 is a cross-sectional view of the rotating scanning means and the housing therefor.

FIG. 3 is a side view of the scanning device and shows the means for moving the scanning device laterally.

FIG. 4 is a top view of the means for moving the scanning device laterally.

FIG. 5 is a view partly in cross-section, of the rotating scanning device and its housing.

FIG. 6 is a top view of a transport for carrying the materials to be scanned to the scanning system.

FIG. 7 is a cross-section, of registration pin (159) and its support, taken along line 7—7 of FIG. 6.

FIG. 8 is a top view of a transport for performing the same function as the transport of FIG. 6, except it shows certain modified forms of tapes for holding the materials to be scanned.

FIG. 9 is a detailed view of a portion of FIG. 8.

FIG. 10 is another detailed view of a portion of FIG. 8.

FIG. 11 is a detailed view of still another portion of FIG. 8.

FIG. 12 is a detailed view of yet another portion of FIG. 8.

FIG. 13 is a top view of a table for holding a transport. This figure is composed of four sub-figures 13A, 13B, 13C and 13D which should be put together as shown in FIG. 21 to show FIG. 13.

FIG. 14A and B is a rear view of the table (FIG. 13) for the transport. This figure is composed of two sub-figures which are to be put together to produce FIG. 14.

FIG. 15 is a right side view of the table (FIG. 13) for the transport. The two parts of this figure are to be put together along the match line.

FIG. 21 shows how the sub-drawings 13A, 13B, 13C and 13D are put together to form FIG. 13. It also shows how sub-drawing 14A and 14B form FIG. 14.

BEST MODE FOR CARRYING OUT THE INVENTION

Before describing the overall machine in detail, a very brief description of it will be given with reference to FIG. 1.

Figure 1:
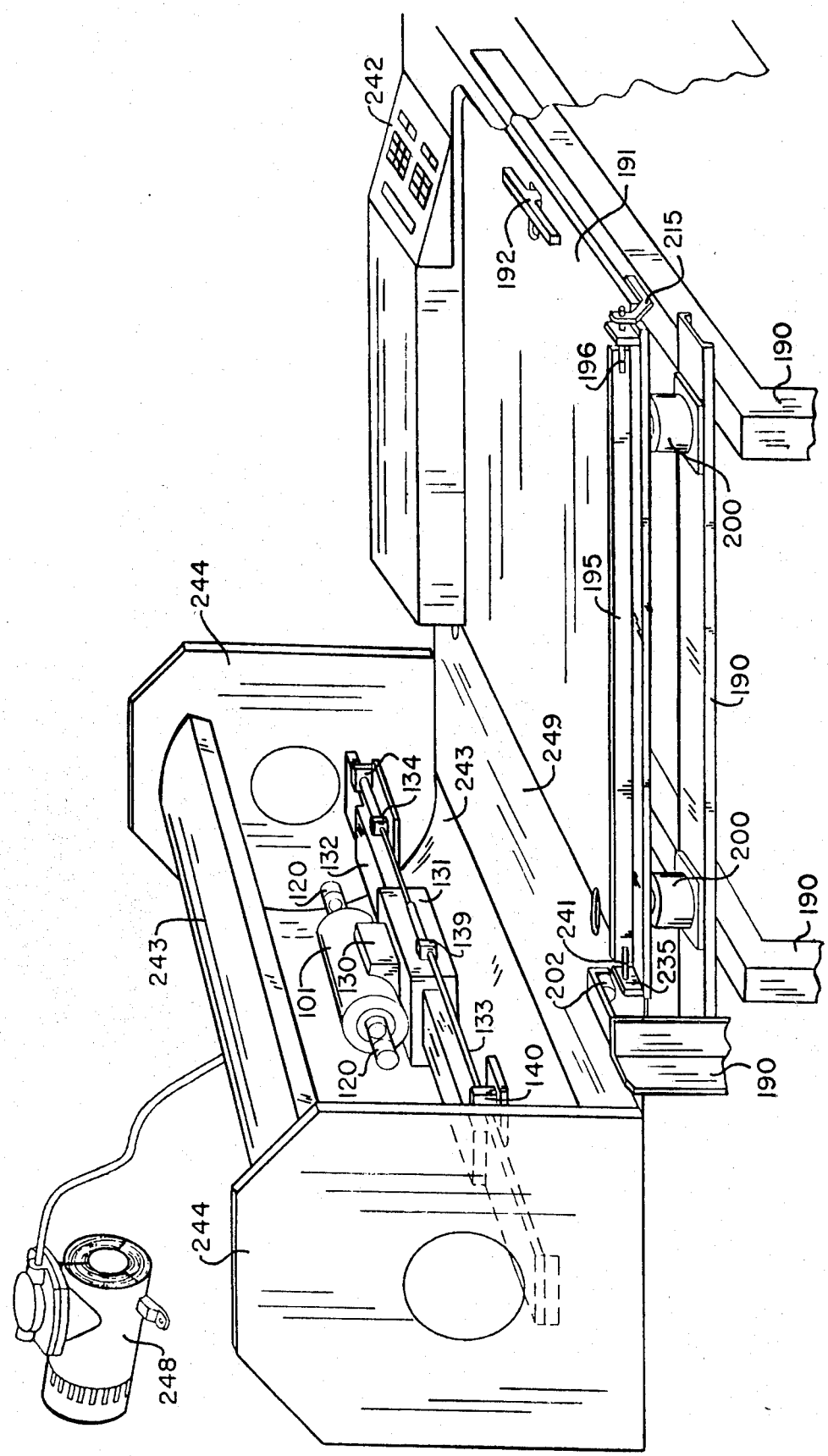
FIG. 1 is a view, partly schematic and partly perspective, of a scanning and feeding device embodying the invention.
Figure 16:
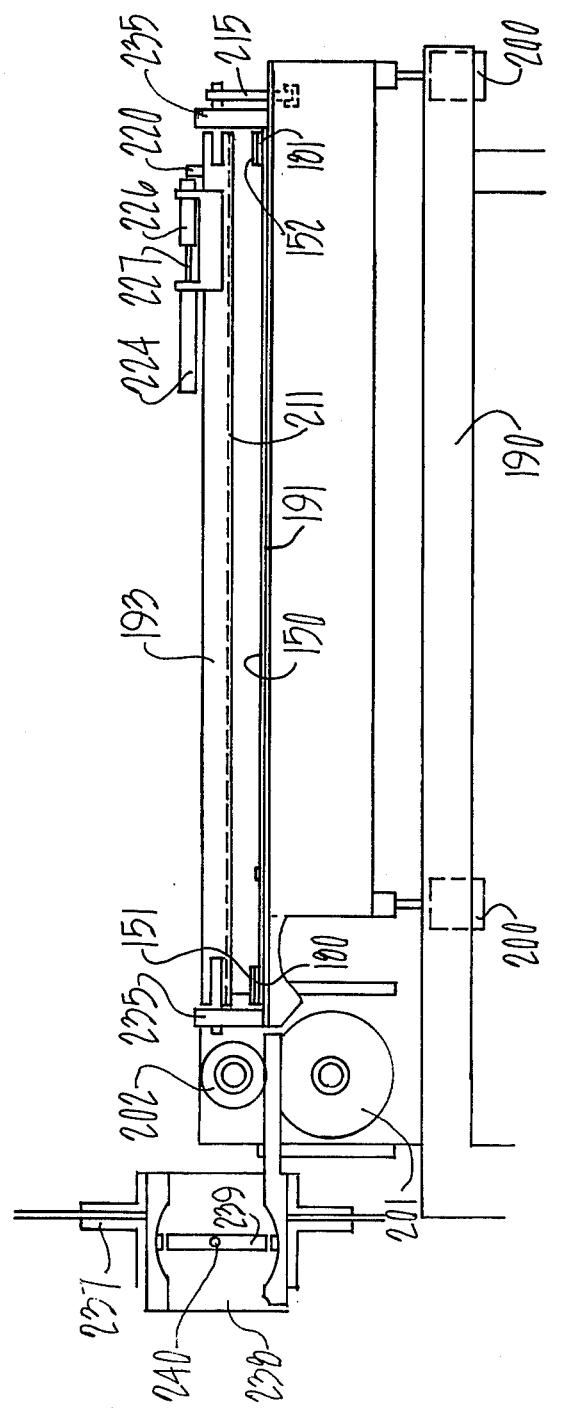
FIG. 16 is a left side view of the Table (FIG. 13) and its associated door.

FIG. 1 is an overall schematic of the scanning device for reading and/or writing using laser beams.

A cylindrical drum section (243), having side walls (244), carries support member (131) which in turn supports cradle (130) which in turn supports the housing (101), which contains a rotating element (120) with mirrors for reflecting the laser beams onto the materials to be read and/or written upon. The mirrors provide scanning and, therefore, both rotate and translate. The rotary motion is achieved by virture of a turbine (118) (FIG. 2) which is operated by compressed air fed into the housing (101). The turbine (118) rotates the rotating elements (120). Linear motion of the elements (120) is provided by the lead screw (133), which is rotated by a stepping motor (136), (shown in FIG. 3), and which passes through the internally threaded housing (138) attached to the support (131) by clamp (139). The lead screw (133) is supported by bearings (134) located in casings (140) and (141).

The reading and/or writing material is placed on a transport (150) (FIG. 6) which is placed on bed (191) in front of bar (192) (FIG. 1). When it is desired to move the transport (150) (FIG. 6), carrying the materials to be read and/or to be written upon, into the drum (243), the bar (192) is moved forwardly a short distance which causes the transport plate (150) to pass to a group of pinch rollers (one of which (202) is shown in FIG. 1). These rollers drive the transport (150) into drum (243) as will be more fully explained. A second transport (150) carrying additional spaces for reading and writing may be placed on two L-shaped brackets, one of which is shown in FIG. 1 and bears reference number (195). A similar L-shaped bracket is provided on the opposite side of the apparatus as more fully explained in connection with FIG. 13. After the first transport (150) has been fed into the drum (243) for the purposes of reading and/or writing, the second transport (150) may be dropped upon the bed (191) by rotating the bracket (195) and its corresponding bracket on the other side of the machine. The second transport (150), therefore, drops by gravity on the bed (191) and has the material for scanning placed on it. After reading and/or writing has been accomplished on the first transport (150) that was sent into the drum (243), the air is exhausted from cylinders (200) to lower bed (191) so that the horizontal section of brackets (195) (and its corresponding bracket on the other side of the machine) are at the level to receive the first transport (150) that was previously fed into the machine. The material in the reading and writing sections of the first transport (150), may, therefore, be changed to provide a new page for the newspaper after the second transport (150) has been loaded and the first transport (150) dropped. The cylinders (200) must be placed under air pressure, or relieved of air pressure, as necessary to correctly position the bed (191) and brackets (195, 197) (FIG. 13). When a transport (150) is to be fed into the drum (243), the bed (191) is in its raised position: and when the brackets (195, 197) are to receive a transport (150) from the drum (243), the bed (191) is in its lower position.

As will appear, a vacuum is desirable in order to hold the transport (150) in place in the drum (243), during scanning, and, therefore, a vacuum pump (248) is provided.

A guiding ramp (249) is provided between the bed (191) and the drum (243) so that the transport may pass along this ramp when passing to and from the drum (243).

The bearing (100) is supported by the housing (101) which as we shall see, moves laterally and parallel to the material to be scanned, but does not rotate about the axis (109) of FIG. 2. The shaft (102) rotates, with reference to the bearing (100) and the housing (101), around the axis (109). Air under pressure from 80 to 100 pounds per square inch is connected to input (103) and enters an annular slot (105) which completely encircles the outer portion of bearing (100). The air under pressure also enters annular trough (104) through holes (1030), to thus provide an air bearing surface between the rotating shaft (102) and the bearing (100). This air space (106), between bearing (100) and shaft (102), is approximately 0.0028 inches wide. The air is slowed along the gap (106) between bearing (100) and shaft (102) by seals (107) which are of annular shape leaving a gap of 0.0002 inches and are preferably made of a material known as Vespel manufactured by DuPont. The O rings (108) prevent leaking of the air passing inlet (103) to the annular groove (104). The cap (110) is connected to the housing (101) and has a vent (111) which feeds hole (1110) (FIG. 20), whereby any air which leaks past seal (107) is vented to the atmosphere. Some air from the gap (106) also passes seal (107) to space (113) which is at lower pressure, as will be seen, than the pressure in gap (106).

Air under pressure from a servo mechanism that controls the air pressure (see part 142 in FIG. 5) enters inlet (114) to the spaces (116), and then via air ports (115) to the ports (117) to drive the turbines (118). The turbines rotate the endplates (119) which in turn rotates optical housing (120) which carries with it the mirrors (121) and the lens (122), both of which, therefore, rotate at the same speed as the turbines (118).

Air under pressure at about 40 lbs. per square inch is also fed into the annular groove (123) from which air under pressure passes slowly through the bronze porous plate (124) and applies pressure to the flat inner surface (125) of the turbine (118). An air gap of approximately 0.003 to 0.005 inches is provided between the porous plate (124) and the plate which comprises the end surface (125) of the turbine (118).

Heretofore, devices with rotary air bearings have been used, not only in connection with scanning devices of the general class involved here, but also in other applications. One problem that has arisen in connection with such air bearings is that there is unwanted lateral movement between the housing and the rotating part. Such unwanted lateral movement is very objectionable in the case of a scanning device of the character involved here because any lateral error in the position of the mirrors (121) will cause an error in the materials being read and/or printed as the case may be. This lateral movement which causes such error is avoided, in accordance with this invention, by reason of the porous bronze plate (124) at both ends of the device. Air under pressure enters the annular cavities (123), both at the right end of the device via feed line (1230) and at the left end of the device via feed line (1231), and passes slowly through the porous bronze plates (124) and applies pressures on the flat surfaces (125) of the turbines (118) (see FIG. 19).

With reference to FIG. 2, the air under pressure to cavity (123) on the left side of the machine is preferably separately regulated from the air pressure entering cavity (123) on the right hand side of the machine, and if this is not done, instability may result. The correct pressures for the two cavities (123) are selected experimentally using two pressure regulators (1232) and (1233) (FIG. 2.) The two pressures are adjusted to achieve maximum stability.

The end plate (119) is attached to the shaft (102) by threads. The inner surface of shaft (102) is threaded along surface (126) and the outer surface of the ring attached to end plate (119) is threaded on its outer surface (127). The mating threads between the inner surface of shaft (102) and the outer surface (127), hold the end plate (119) to the shaft (102).

The current to pressure transducer (142) (FIG. 5) may be Fairchild Series T5100 manufactured by Fairchild Industrial Products Division, 1501 Fairchild Drive, Winston-Salem, N.C. Preferably this apparatus is catalog number T5120-1 having an input impedance of 2,340 ohms and an input range of 1 to 5 milliamperes. This transducer controls the air pressure to inlet (114) and holds that pressure at approximately 40 lbs. per square inch as previously explained.

Tapped holes, such as (128), may be placed in the ends of plates (119). Set screws may be inserted (or omitted) in these holes. The size and placement of the set screws may be selected to perfectly balance the rotating mechanism mechanically.

Figure 19:
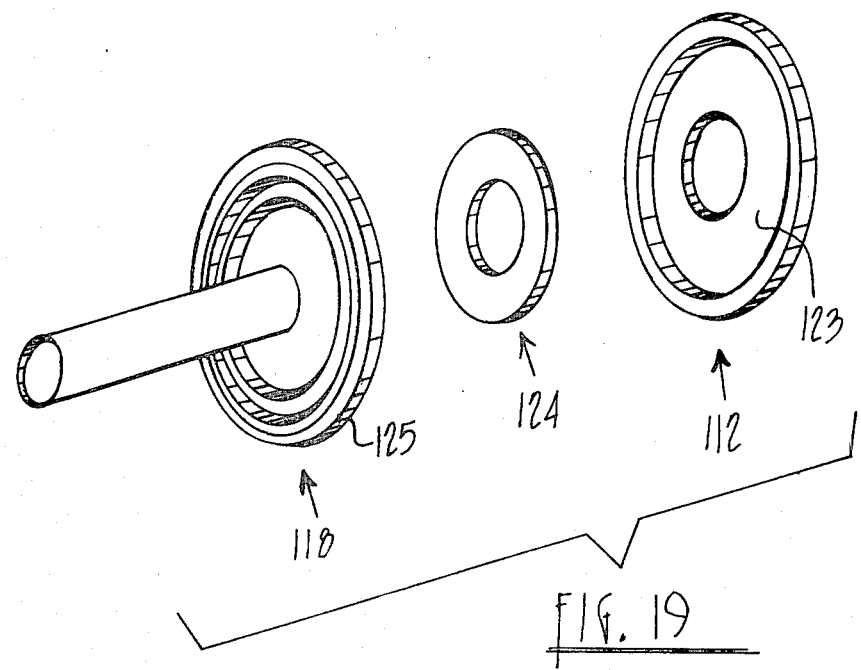
FIG. 19 is an exploded view of certain details of FIG. 1.

FIG. 19 is an exploded view of the details of the manifold (112), the bronze porous plate (124) and the end plate (125) of the turbine (118).

Figure 20:
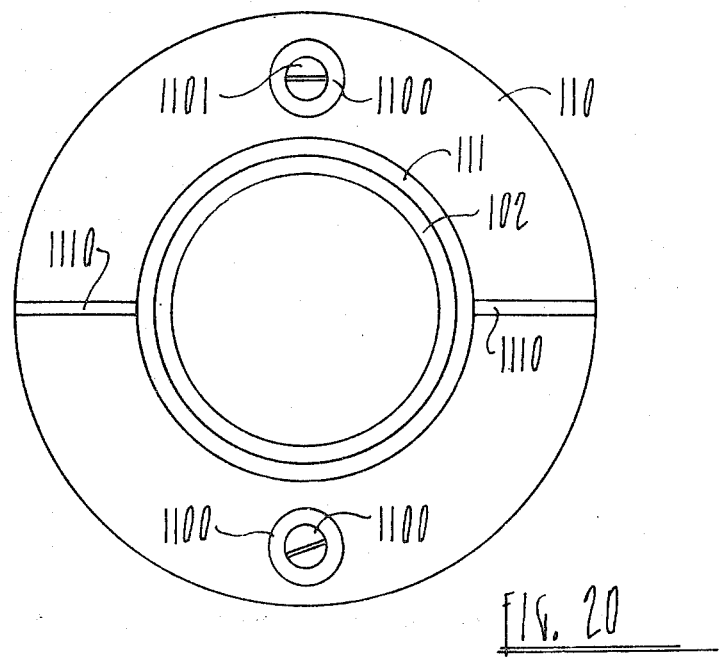
FIG. 20 is a cross-sectional view along line 20—20 of FIG. 1.

FIG. 20 illustrates certain details of caps (110) (FIG. 2). There are two of these caps (110), one at each end of the rotating apparatus of FIG. 2. While only the details of the left cap (110) are shown in FIG. 20, it is understood that the right hand cap (110) (FIG. 2) has similar details. The cap (110) has a borehole (1100) through which bolt (1101) passes to fasten the cap (110) securely to housing (101).

One desirable feature, shown in FIG. 20, is that there are air bleed holes (1110) extending from vent (111) to the ambient atmosphere to thus allow an escape of air that passed the outermost seals (107) into vent (111).

FIG. 3 shows the supporting mechanism for the apparatus shown in FIG. 2 and also moves the apparatus shown in FIG. 2 laterally for the purpose of providing the lateral component of the scanning motion. The scanning motion obviously has, in addition to the lateral movement, a rotating movement which has already been described. The housing (101) originally explained in connection with FIG. 2 and which is also shown in FIG. 3 is supported by the cradle (130). The cradle (130) is mounted on the Pneumo-Linear slide (131). This slide (131) is manufactured by Pneumo Precision, Inc., Precision Park, Keene, N.H., and, together with its supporting rail (132), is an established and well known supporting element. The slide (131) is supported, by air pressure, from the railing (132) which is also manufactured by said Pneumo Precision, Inc., as aforesaid.

In other words, the stationary rail (132) supports the slide (131), and the support function between (131) and (132) is by means of air pressure. The slide (131), in turn, supports the cradle (130) which in turn supports the housing (101).

Running parallel to, and along side of, the supporting element (131), and the rail (132), is a lead screw (133) which is supported by three bearings (134) and which is prevented from unwanted lateral movement by collar (135) which preloads two bearings (134) against each other. The lead screw (133) is rotated by stepping motor (136) which is connected to the lead screw (133) by the coupler (137).

The stepping motor (136) (FIG. 3) may be model M83-62 series motor/driver manufactured by Compumotor Corporation, 1310 Ross Street, Petaluma, Calif. This stepping motor (136) has 25,000 steps per revolution, and a preferred speed of approximately 1 revolution per second. Using a 10 pitch lead screw (133), the apparatus of FIG. 2 scans approximately 1,000 lines per inch during reading and/or writing. Following the scanning of a complete page, the stepping motor runs in reverse at a speed of approximately 6 revolutions per second in order to return the apparatus of FIG. 2 to its starting position for a new scan.

The stepping motor of 136 is a specie of the form of motors known as synchronous motors. With a synchronous motor it is possible to determine electrically the exact lateral position of the scanning system (FIG. 2) at any given time.

The preferred speed for the turbine (118) is 6,000 rpm whereby the mirrors rotate at that speed during scanning.

FIG. 4 is a top view of FIG. 3. In FIG. 4 the stepping motor (136) drives the coupler (137) which in turn drives the lead screw (133) which cooperates with the lead screw nut (138) (FIG. 3) which is held in fixed relation to the apparatus of FIG. 2 by bracket (139). The lead screw bearings are supported by support blocks (140) and (141). The bracket (139) is firmly attached to the support (131) which is carried by the rail (132) by air pressure as explained heretofore. The apparatus of FIGS. 3 and 4 rests on base (1400).

FIG. 5 is another view of the device of FIG. 2 showing certain additional details. A laser beam (145) is shown entering the left end of the apparatus where it is focused by the lens (122) onto the mirror (121), and as the mirror rotates about the axis (109) (FIG. 2), the laser beam is reflected to provide scanning. This beam intermittently and periodically passes encoding device (143) which reflects one signal pulse for each revolution of the mirror (121). The pulses may be used for counting, synchronizing or the like. The light reflective encoder (143) is supported by bracket (144) from the cradle (130) which is more fully shown and explained in connection with FIG. 3.

FIG. 6 shows a transport (150) for transporting the material which is to be read (usually one full page), or the laser plate upon which writing will occur, into the drum of the machine as will subsequently be more fully explained. The transport (150) is basically a sheet of epoxy glass, NEMA G-10 manufactured by various companies including Westinghouse Corporation. Such a sheet is flexible so it can follow the inner curved surface of the drum (243), shown in FIG. 1. The sheet (150) has metal strips (151) and (152) along its forward and rear ends respectively. The forward strip (151) has indents (153) for the purpose of coarse registration, as hereafter will be explained. The entire device of FIG. 6 moves into the read/write drum (243) (FIG. 1) along the direction of arrow (154). For precise registration purposes there is a metal strip (155) having a registration hole (156) near its right end and a registration slot (157) near its left end.

Registration pins (159), for locating printing plates and paste-ups, project upwardly from the flexible plate (150). The details of the pins (159) are shown in FIG. 7. Each pin (159) has a metal base portion (160) and a metal washer (161) to hold it in place.

A number of strips (162) of polyurethane tape define the areas for the reading and writing materials. Strips (162) serve basically as a vacuum barrier for the material, on which reading or writing is to be undertaken. Such material will be sealed in place on the sheet (150).

Assuming that there is a page of material, which is to be converted into a printing plate, it would be placed in the reading section, which would normally be the left-hand rectangular section of FIG. 6, bounded by tape (162). After the material to be read has been positioned as aforesaid, a sheet of Plexiglas (163) (FIG. 8) is applied on top of the material. This sheet of Plexiglas (163) has clearance holes (164) which are slightly larger than the registration holes (159) to make sure that the piece of Plexiglas (163) covers the material to be read.

The strip of tape (165) acts as a hinge and enables the Plexiglas sheet (163) to be opened like a book for the insertion or removal of material to be read. At the right edge of the Plexiglas sheet (163) there is a flap (166) which is securely bonded, or otherwise fixed, to the glass epoxy sheet (150) but is not bonded or sealed to the Plexiglas sheet (163) and therefore constitutes a flap which may be used to cover the right edge of the Plexiglas sheet (163). The Plexiglas sheet (163) is, of course, transparent and non-polarized so that reading may take place through it. The flap (166) has slits (167) to prevent buckling when the epoxy glass sheet (150) moves into a curved position as will appear later. The flaps provide restraint to hold the materials into the transport (150) as it curves into the drum (243).

FIG. 9 illustrates a detail of the right hand section which is used to hold the output material (such as a printing plate or lasermask) on which writing may take place. The strips of tape (162) serve the same function for the (writing) right hand rectangle as they did for the reading (left hand) rectangle. They are covered by a flap (168) which is secured to the epoxy sheet (150) by tape (169). Slits (170) are provided to prevent buckling. These flaps also provide restraint to the materials.

A flexible thin aluminum plate is positioned on the epoxy sheet (150) beneath the output material and held along its left edge by flap (168). Its right edge is held by flap (171).

Flap (171) is hinged by a piece of tape (172) so that the flap may be raised out of the way to position the aluminum plate and the output material as desired. When the aluminum plate and the output material have been placed in position and their left and right hand edges covered by flaps (168) and (171), respectively, the transport sheet (150), and the elements held by that sheet, are ready for movement into position for reading and writing.

The details of the lower right hand corner of the Plexiglas sheet (163) and its covering are shown in FIG. 11, where the strip of tape (162) forms the outer limits of the material to be read and the Plexiglas sheet (163) is shown extending on top of tape (162). Two strips of tape (174) applied over the top of strip (162) are added so that all three strips of tape (162) and (174) equal the thickness of the Plexiglas sheet (163). The flap (166) is placed on top of tape (174) and is held in place by the strip of tape (175) which permits strip (166) to be hinged and, thus, be readily removable from, or placed onto, the top of Plexiglas sheet (163).

The details of the lower left hand corner of the Plexiglas sheet (163), are shown in FIG. 12 where the strip of tape (162) overlaps sheet (150). The sheet of Plexiglas (163) overlaps the tape (162) and is hinged to the sheet (150) by the strip of tape (165).

A magnet (176) is located on the strip (151) to enable the position of the apparatus to be sensed. This magnet is used for control purposes as will be explained later.

A limited portion of the right hand end of strip (152), namely portion (177), is thinner than the remaining portion of strip (152) because it is engaged by a pinch roller for driving the sheet (150) into position.

In like manner, a limited portion (178) of the right hand end of strip (151), a limited portion (179) of registration strip (155), a limited portion (180) at the left end of strip (151) and a limited portion (181) of strip (152) are also made thinner than the remainder of the strips to which they are connected for reasons similar to that described in connection with the thin portion (177).

Two identical transports (150) of the type shown in FIGS. 6 and 8 are normally used. The one which is first fed into the drum (243) will hereafter be called the first transport (150), and the other one will be called the second transport.

FIGS. 13, 14, 15 and 16 show the table on which the transport (150) of FIG. 6 is mounted prior to transport (150) being fed into the machine for reading or writing. These FIGS. 13 to 16 show a frame (190) and the bed (191) of the table. Near the rear end of the bed (191) of the table is a bar (192) which has a normal (rear) position shown in full lines and a forward position shown in dotted lines. The rear end of metal strip (152) of the transport (150) (FIG. 6) is placed on the table directly in front of bar (192) when the latter is in its rear (full-line) position. The overall width of the transport (150) (FIG. 6) is slightly smaller than the distance between the vertical members (193) and (194) of the brackets (195) and (197). The upper ends of the vertical members (193) and (194) are pivoted at (196) and (198) respectively. The length of transport (150), including strips (152) and (153) is slightly less than the lengths of brackets (195) and (197).

There are four air cylinders (200) which always operate in synchronism to either raise or lower the table by about 1 inch. When there is air pressure in the upper section of the four cylinders (200), the table bed (191) is in its lower position and when air pressure is applied to the four cylinders (200) in the lower section, the air pressure moves the table bed (191) to an upper position about 1 inch above the lower position.

When the table (191) has been raised to its upper position aforesaid, the plane of a transport (150) resting directly on bed (191) now coincides with the horizontal tangent of the pinch rollers (201, 202, 203 and 204).

Rollers (202) and (204) are idle rollers which normally contact rollers (201) and (203) respectively. It is the horizontal tangent of the rollers, where the idle rollers contact the drive rollers (201) and (203), that is in the same plane as the transport (150), when the latter is resting on bed (191).

A motor (205) drives timing pulley (206) which in turn drives timing belt (207) which, in turn, rotates the driving rollers (201) and (203). The idling rollers (202) and (204) are driven by reason of their contact with rollers (201) and (203).

If we assume that the first transport (150), such as is shown in FIG. 6, is resting in its normal position on bed (191) with the rear edge of strip 152 (FIG. 6) in contact with a forward end of the bar (192) when the latter is in its rear position (solid lines), the apparatus is now ready to push the first transport toward the drum (243) for purposes for reading and/or writing.

Air cylinder (210), when air pressure is applied to it, causes bar (192) to move forwardly from its rear (solid line) position (FIG. 13) to its dotted line or forward position. When this bar moves forward, it presses the metal strip (152) (located at the rear end of the transport (150) of FIG. 6), forwardly, causing the forward end (151) of the first transport (150), to move into a position where the thin ends of strip (151) are pinched between the pairs of rollers. That is to say the thin left end (180) of strip (151) moves between and is pinched between drive roller (201) and idle roller (202): and at the same time the thin right portion (178) of strip (141) moves between and is pinched between idle roller (204) and drive roller (203). Since the drive rollers (201) and (203) are driven by motor (205), the transport (150) continues to move forwardly into the drum (243) of the cylinder. Completion of the loading of the transport (150) will be described later.

After the first transport (150), described above, was fed into the machine, the operator may have loaded a second transport (150) so that it may also be fed into the machine as soon as the first transport (150) has been scanned and returned from the drum (243). In order to accomplish this result the operator has laid the second transport (150) on the shelves (211) and (212) of brackets (195) and (197) respectively. As soon as the first transport (150) has registered into drum (243), sensors (not shown) sense that action and automatically apply pressure to cylinders (213) and (214) to thereby cause arms (215) and (216), which are respectively connected to brackets (195) and (197), to rotate the brackets (195) and (197) about the pivots (196) and (198) respectively. Since the bracket (195) rotates clockwise, and the bracket (197) rotates counterclockwise, the second transport (150), which is now positioned on the brackets (195) and (197), will fall due to gravity onto the bed (191) of the table. Guides (217) and (218) are mounted on the upper surface of bed (191) and guides the second transport (150) after it has dropped by reason of gravity from the brackets (195) and (197). Guides (217) and (218) run the entire length of the bed (191) and are, of course, located on the bed (191) underneath the brackets (195) and (197), as shown in FIG. 14.

After the first transport (150) has been fed into the drum for scanning, and the second transport (150) has been dropped from brackets (195) and (197), onto the table (191), the brackets (195) and (197) are now ready to receive the first transport (150) after it has been scanned.

To prepare the apparatus for this function, the air is allowed to escape from cylinders (200) and the table bed (191) is lowered by 1 inch so the horizontal shelves (211) and (212) are at the same level as the horizontal plane that is the tangent of rollers (201) and (202) at the point of contact between those rollers. The first transport (150) that is returning from the drum (243) is therefore, at the same level as the shelves (211) and (212) and, since the motor (205) has been reversed, the rollers are driving the first transport (150) toward the rear of the brackets (195) and (197). This action continues until the first transport (150) has been driven as far rearwardly as the rollers (201) to (204) can drive it.

As the first transport (150) is being moved rearwardly, the upper side of it is engaged by brushes (219) for the purpose of firmly holding the first transport (150) against the upper surface of shelves (211) and (212). When the first transport (150) clears rollers (201-204), its strip (152) is moved more rearwardly than arms (220) and (221), which arms are respectively pivoted at (222) and (223). Next, the arms (220) and (221) are rotated about pivots (222) and (223) until the arms (220) and (221) contact the epoxy glass portion of the first transport (150). The arms (220) and (221) are then translated rearwardly, thereby causing the first transport (150) to move to a position where the rear edge of strip (152) (FIG. 6) is above the forward edge of bar (192), it being noted that this bar has been moved to its most rearward (solid line) position since the air pressure has been removed from cylinder (210).

It will be recalled that the second of the two transports (150) has been dropped onto the table bed (191), where it has remained while the first transport (150) has been scanned and returned. The second transport (150) is now fed into the scanning drum (243) by means of bar (192), rollers (201-204), etc., the same as was done for the first transport (150). Pressure may now be applied to cylinders (213) and (214) to cause the first transport (150) to fall on bed (191). The operator may now replace the paste-up or other material to be printed from the left hand section of the first transport (150), and similarly he or she places new output material into the right hand section of the first transport (150).

In order to provide the rotary and transitory motion of arms (220) and (221), there are provided two Stilson Miniature Rota-Clamps. The first of these Rota-Clamps comprise a housing (226) and a shaft (227). The housing (226) is supported by a frame (230) which is part of the bracket (195). The Stilson Miniature Rota-Clamp (226), (227) is so arranged that when the forward end of shaft (227) is pressed rearwardly, by the air cylinder (224), the arm (220) first rotates until it contacts the first transport (150), and then it translates rearwardly until it moves the first transport (150) to its ultimate final position above the edge of bar (192). The Stilson Rota-Clamp (228, 229) is held in position by frame (231) of the bracket (197). The second Stilson Rota-Clamp (229) is mounted on bracket (197) and when air pressure is applied to cylinder (225), it first causes rotation of arm (221) and then provides translation of arm (221) to move the first transport (150) rearwardly to its final position. Air pressure is normally applied to cylinders (224) and (225) simultaneously to thus cause arms (220) and (221) to act in unison in moving the first transport (150) rearwardly.

As stated earlier when the first transport (150) was on the brackets (195) and (197), the second transport (150) was being fed into scanning position. To do this air pressure was fed into cylinders (200) to raise bed (191). Bar (192) was moved forwardly, rollers (201 to 204) were rotated and all other steps performed in the sequence that was necessary for moving a transport into scanning position. Such steps were described in connection with moving the first transport (150) into scanning position. After the second transport (150) is fed into scanning position, the first transport (150) is dropped from brackets (195) and (197) onto bed (191) so material can be loaded and it can be fed into drum (243). The aforesaid procedure using the two transports (150) can be repeated over and over to form all of the pages of a newspaper.

The bracket (195) is pivoted about shaft (196) which in turn is supported by support elements (235) at both the front and rear ends of the machine. Similarly supports (236) support shaft (198) which carries bracket (197).

The drum (243), which is fed with a transport (150), is bounded by a wall (237) which has an opening (238), covered by a door (239), pivoted at (240). The purpose of the door (239) is to prevent the laser beam from exiting from the drum and injuring the personnel, such as by entering the eyes of the operator. Whenever a transport (150) is being fed to or from the drum, the door (239) is open. Whenever the door (239) is open, a mercury switch operated by rotation of the shaft (240) of the door deenergizes a solenoid to move a shield (not shown) to a position which prevents the laser beam from being directed toward the opening (238). When a transport (150) is not entering or leaving the drum (243), the door (239) is closed and this prevents the laser beam from injuring the operator.

Figure 17:
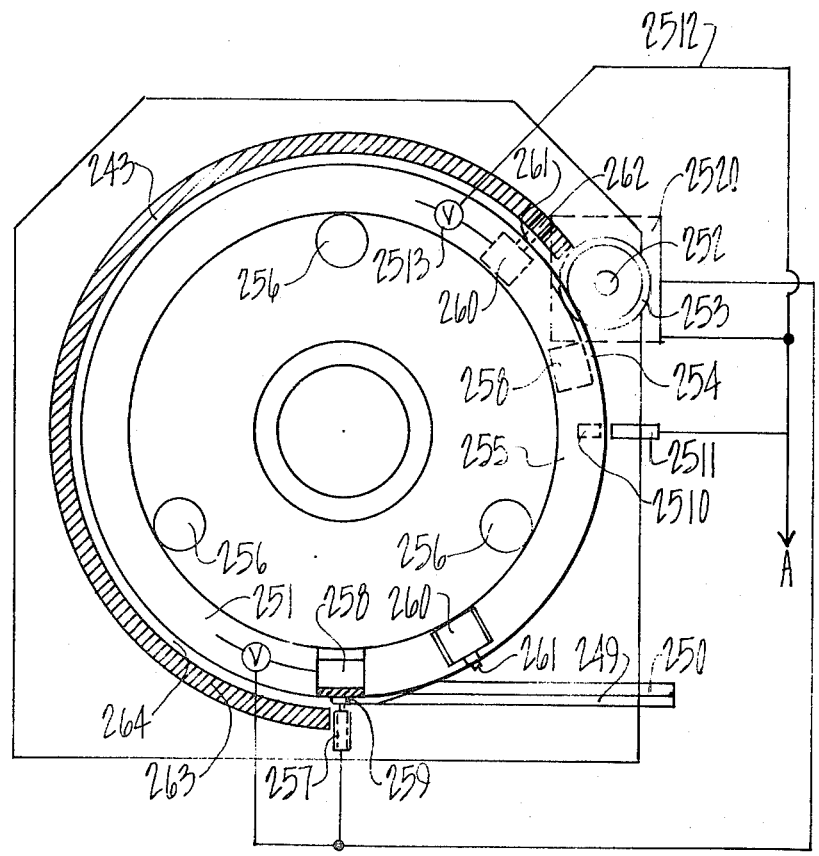
FIG. 17 shows a disc inside the drum together with means for positioning a transport in the drum (243).

FIG. 17 illustrates the drum (243) and the apparatus of the left end of the drum for processing a transport (150). The ramp (249) has an upstanding flange (250), at each side thereof, to guide the transport into the the correct position as it enters the drum (243). As the transport (150) enters the drum (243), the magnet (176) (FIG. 6) on the transport (150) passes across sensor (257) which senses the presence of the magnet and thereupon actuates an electrical circuit which in turn applies air pressure to cylinder (258) which in turn causes shoulder screw (259) to be moved upwardly. Since the side walls of the left hand slot (153) in the forward strip (151) of the transport (150) (FIG. 6) have straddled the shaft (263), it is apparent that when the head (259) of the shoulder screw moves upwardly, it clamps the left end of strip (151) (see FIG. 6) to the disc (251) (FIG. 17). Since there is a similar shoulder screw and air cylinder on the right hand side of the drum (243), which cooperates with the slot (153) at the right end of transport (150), there will be two shoulder screws (259) clamping the strip (151) to rotatable discs such as (251). When the sensor (257) sensed the magnet (176), it not only energized the circuit (2571) which caused air pressure to be applied to cylinder (258), but it also energized a circuit starting a motor (2520) having a shaft (252) connected to a gear (253) which is mated with another gear (254) on disc (251), and thereby caused the disc (251) to start rotating. In view of the fact that the strip (151) of the transport (150) has been clamped (by shoulder screw head (259)) to the disc (251), the rotation of disc will continue to move transport (150) along slot (264) until the transport (150) has reached its final position, as will hereafter be described.

Shortly after the disc (251) begins to rotate, the pin (261) engages registration hole (157) (see FIG. 6) and thereby, ensures that the transport is registered with the inside surface of the drum (243). In its final position, the pin (261) is not only passing through the slot (157) but is in alignment with hole (262) in the drum (243), whereupon air pressure is applied to cylinder (260) to press pin (261) through the hole (157) and into the hole (262) in order to hold the transport (150) and disc (251) in precise position during scanning. The disc (251) is supported by rollers (256) which insures that it rotates with respect to the drum (243) axis.

Suitable means can be provided for automatically stopping the disc (251) when the pin (261) is in alignment with the hole (262). Such means may, for example, include a magnet (2510) on the disc (251). This magnet will be sensed by sensor (2511) when the disc (251) is rotated to the position where pin (261) is facing hole (262). An electrical circuit (2512) is provided for deenergizing the motor (2520) and thus, stopping motor shaft (252) in a position where pin (261) registers with hole (262). Circuit (2512) applies current to valve (2513) to admit air to cylinder (260) to move pin (261) into hole (262).

It is understood that the disc (251), bearings (256), cylinders (258) and (260), shoulder screw (259) and registering pin (261), together with hole (262), are located along the left hand margin of the transport (150), within the drum, for the purpose of driving and registering of the left hand portion of the transport (150). Similar devices are located at the right hand side of drum (243) to perform the same function along the right hand margin of transport (150).

Figure 18:
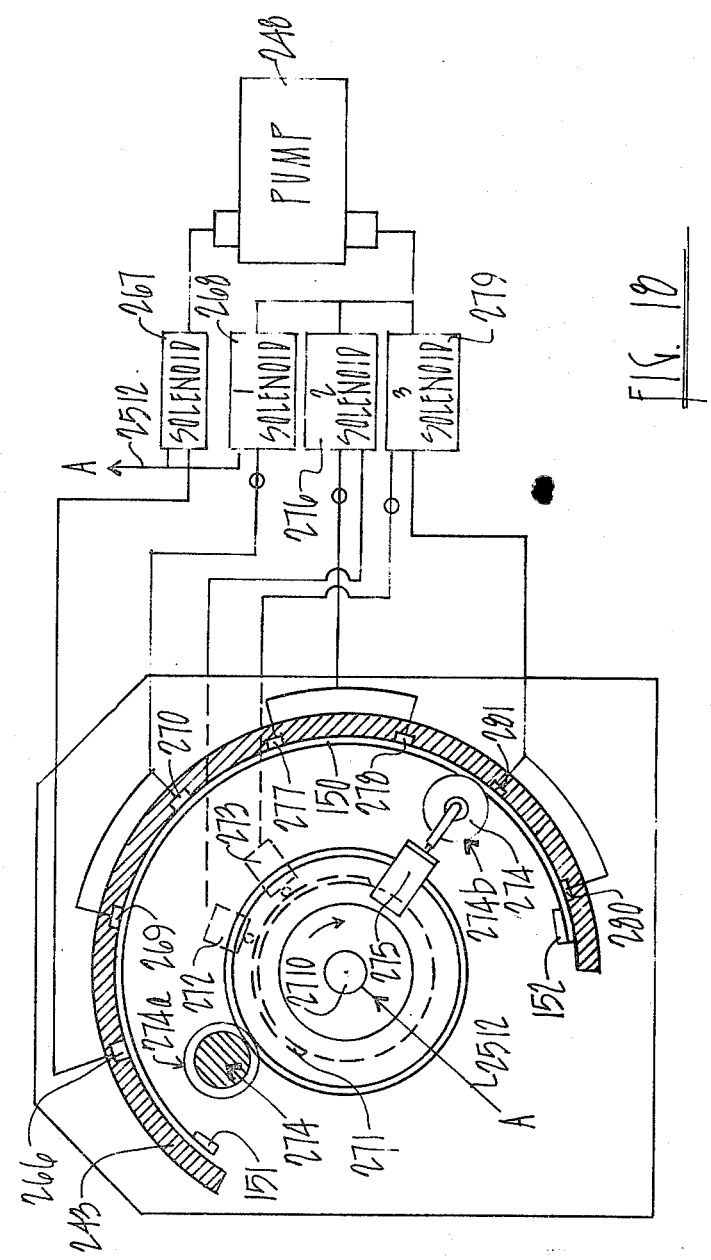
FIG. 18 shows further details of the means in the drum for positioning a transport.

FIG. 18 is a sectional view of the drum showing the vacuum system and is a view from the right hand side, as distinguished from FIG. 17 which is a view from the left hand side.

In FIG. 18, the transport (150) is shown in its final position with strip (151) at its forward end and strip (152) at its rear end. It is further assumed that the transport (150) has been moved to its final location within the drum (243) and that the registering pin (261) has entered hole (262) as described in connection to FIG. 17.

The transport (150) has holes (265) extending completely through the epoxy glass sheet (150) and located just below the upper piece of tape (162) for sealing the output material.

The aluminum plate which is used for making a printing plate extends from the lower piece of tape (162) (FIG. 6) to the lower edge of the holes (265) Therefore, there is a space between the upper end of the aluminum plate and the lower end of the upper strip of tape (162); and the holes (265) communicate with that space and are in alignment with the groove (266) which runs across the drum (243) parallel to the axis thereof. The groove (266) is connected, by tubing, to a solenoid valve (267) which is in turn connected to one input of vacuum pump (248). The pump has two separate inputs.

The output material (not shown) extends the complete distance from the upper edge of the lower strip of tape (162) to the lower edge of the upper strip of tape (162), so that it covers the air space between the upper edge of the aluminum plate and the lower edge of the forward strip of tape (162). The vacuum created in groove (266) and extending through the holes (265), therefore, sucks the output material toward the epoxy glass plate (150) along a limited upper portion of the output material. The output material is held in position along its right and left hand sides, until vacuum is applied, by the flaps (168) and (171) (FIG. 8). In this respect, see also FIG. 10.

The two solenoid valves (267) and (268) have an input electrical circuit connected to control wire (2512) (FIG. 17) which causes these solenoid valves to open when the pin (261) is registered in the hole (262) as aforesaid.

Grooves (269) and (270) run across drum (243) and apply vacuum to the upper part of the transport (150) to hold it firmly against the inside wall of drum (243). The vacuum for grooves (269) and (270) comes from the second input of the pump (248).

After the pin (261) has registered with hole (262) as aforesaid, the following series of events happens. The cam (271), when it is normally at an angular position 180° from that shown, is not actuating either of the switches (272) or (273). The squeegee roller (274) is shown in its inward position, as shown in (274A). When the pin (261) has moved to the position of registration with hole (262), circuit (2512) is actuated which not only energized solenoids (267) and (268) but also started motor (2710) for rotating the cam (271) clockwise. The squeegee roller (274) then moves outwardly into contact with the transport (150), under the force of air pressure fed into cylinder (275). As the cam (271) rotates clockwise, the squeegee roller (274) similarly swings clockwise until it reaches the position (274B). Since the cam rotates clockwise, it first actuates switch (272) which energizes solenoid valve (276) to allow vacuum to be applied to grooves (277) and (278); thus, sucking another section of the transport (150) inwardly towards the inner wall of (243).

As the cam (271) rotates further in the clockwise direction, it energizes switch (273) which energizes solenoid valve (279) and applies vacuum to grooves (280) and (281). Like the other grooves, each of grooves (277, 278, 280 and 281) run across the drum (243) parallel to the axis thereof, and when vacuum is applied thereto, the transport (150) is sucked against the inner wall of the drum (243). As the cam (271) was rotating by about 160°, the squeegee roller (274) has been held against the inner wall of the transport (150) and has applied pressure to press the transport (150) against the inner wall of the drum (243), to thus iron out any bubbles or other irregularities in the positioning of the transport (150) within the drum (243).

It is noted that the suction through grooves (266, 269 and 270) is applied as soon as the pin (261) registers with hole (262). At about the same time that the vacuum is applied to those grooves, the squeegee (274) is extended, and cam (271) and squeegee (274) begin rotating clockwise to, first move the cam into position, and secondly start the squeegee pressing the transport against the inner wall of (243). The squeegee is so positioned with respect to the switches (272) and (273) that the squeegee passes over the portion of the transport (150) that is covered by vacuum grooves (270) and (278) before suction is applied to those grooves. Similarly, the squeegee (274) passes over the portion of transport (150) that is covered by grooves (280) and (281) before the vacuum is applied to those grooves.

After scanning has been completed, the air pressure to cylinder (275) is reversed and the squeegee (274) retracts. The solenoid valves (267, 268, 276 and 279) are then deenergized, and pin (261) is retracted from hole (262) by cutting off the air pressure to cylinder (260). The transport (150) is now free to be removed from the drum (243). The motor (2520) which is controlling disc (251) is then reversed and the transport (150) is then ejected from the drum (243) along ramp (249). Once the transport (150) has reached the point where its rear strip (152) has reached the pinch rollers (201 to 204), those rollers then cause the transport (150) to continually move outwardly onto the brackets (195 and 197) (FIG. 13) until the strip (152) has passed the arms (220) and (221). Thereafter, application of air pressure to cylinders (244) and (225) cause the arms (220) and (221) to not only rotate, but also translate, and move the transport (150) along the brackets (195 and 197) to its normal starting position ahead of the front end of bar (192). Then that transport (150) is allowed to drop onto bed (191), as aforesaid.

The overall operation will now be stated:

Let it be assumed that two printing plates for two pages of a newspaper are to be prepared. The paste-up for the first page would be placed in the left hand section of the first transport (150) of FIG. 6. An aluminum plate together with an output material would be applied to the right hand section of said first transport (150) (FIG. 6) as aforesaid. This transport (150) would then be placed on the bed (191) of the table (FIG. 13) between the guides (217) and (218). The bar (192) would be in its rearward position and the rear end of strip (152) would be positioned against the forward face of the bar (192). The bar (192) is then moved forwardly pressing the first transport (150) into the rollers (201 to 204) which pinch the forward sections (181) and (178) of the bar (151), and cause the first transport (150) to move forwardly into the drum (243). The door (239) is then opened and at the same time a shield is moved into a position to prevent the laser beam from passing the opening (238). The rollers (201 to 204), acting upon the right and left edges of the transport (150) continues to push the first transport (150) forwardly until grooves (153) engaged the shoulder screw (159). At the same time that the aforesaid engagement occurs the magnet (176) is sensed by sensor (257) which causes air pressure to be applied to cylinder (258) to thus clamp the leading edge of strip (151) to the disc (251). The disc (251) then rotates until pin (261) registers with hole (262). The first transport (150) has now been rotated to its scanning position. Air pressure is then applied to cylinder (260) to cause the pin (261) to engage hole (262) and maintain the first transport (150) in its scanning position. At this point, the cylinder (258) is now located in its dotted line position. The air pressure applied to opening (114) rotates the turbine (118) which in turn rotates the shaft (102) and its heads (120). This accomplishes the rotating component of the scanning. The horizontal component of the scanning is accomplished by stepping motor (126) rotating the lead screw (133).

As a result, the reading and writing sections of the first transport (150) are scanned. While all of this has been taking place, the operator has applied the second page of paste-up material in the left hand section of the second transport (150) (FIG. 6) and has provided a new output material in right hand section of FIG. 6. The control system then releases air pressure from cylinders (200) causing the horizontal portions (211) and (212) of brackets (195) and (197) to move into alignment with the rollers (201 to 204). As the disc (251) (FIG. 17) rotates in the counterclockwise direction to the first transport (150), which has now been fully scanned, that transport (150) moves outwardly onto the brackets (195) and (197). Pushers (220 and 221) are activated to push the transport (150) away from the rollers. Air pressure is then applied to cylinders (200) to raise the bed (191) so that the second transport (150) may now move forward through the pinch rollers (201 to 204) in the same manner as was described in connection with the first transport (150). The first transport (150) is now dropped onto the bed (191), then reloaded with the third page of the newspaper to make room for the second transport (150) to return along the brackets (195) and (197). The first transport is now ready to be fed into the drum (243) a second time. This process is repeated until printing plates for the entire newspaper have been prepared.

The writing operation, which can be used to prepare any number of printing plates, is well known prior art. Alternatively, the writing laser may prepare the printing plate directly in accordance with other prior art teachings.

There are two holes (1110) (FIG. 20) extending from slot (111) to the external atmosphere, but not along a line which will intercept one of the holes for the bolts (1101). The vent holes (1110) occur on both ends of the device, and also avoid instability in the operation of the shaft.

Having described the various parts of the invention, it may be helpful, in understanding the requirements of the control system for the machine, to set forth the steps required in order to operate the machine through one complete cycle. These steps are as follows:

1. Apply pressure to cylinders (200) to raise bed (191).
2. Apply pressure to cylinder (210) to push bar (192) forward.
3. Start motor (205) to cause rollers to move transport (150) into drum (243). Door (239) is also opened.
4. Sensor (257) senses magnet (176) which admits pressure into cylinder (258) to cause head (259) to clamp strip (151) of transport (150). The sensing of magnet (176) also starts a motor (2520) which rotates shaft (252) which in turn rotates disc (251) clockwise.
5. A sensor (2511) next senses when pin (261) is in alignment with hole (262), and applies air pressure to cylinder (260) to press pin (261) into hole (262). The door (239) is closed.
6. Air pressure is applied to cylinder (275) to move squeegee (274) outwardly and into contact with sheet (150).
7. Cam (271) rotates clockwise along with squeegee (274).
8. Vacuum solenoid valves (267) and (268) are energized simultaneously, but valve (276) is not energized until squeegee has passed grooves (277) and (278), and valve (279) is not energized until squeegee has passed grooves (280) and (281).
9. Immediately after step 5, air pressure is applied to cylinders (213) and (214) to rotate brackets (195) and (197) to drop second transport (150) on bed (191).
10. Air pressure is removed from cylinders (200) so that bed (191) of table is lowered. The operator may now load the materials.
11. Scanning is performed.
12. Squeegee (274) is retracted and rotated clockwise until it is in its original position.
13. Solenoid valves (267, 278, 276 and 279) are deenergized. Air pressure is exhausted from cylinder (258) so pin (261) is removed from hole (262). The motor which rotates shaft (252) is reversed and transport (150) is driven out of drum (243). The door (239) is opened.
14. Rollers (201 to 204) are driven in reverse by motor (205) to drive first transport (150) out of drum (243) onto brackets (195) and (197). Pushers (220) and (221) are activated to push transport (150) off of rollers.
15. Air pressure is applied to cylinders (200) to raise platform so second transport (150) is in alignment with rollers (201 to 204).
16-24. Steps 2 to 10 are nor performed on the second transport (150).
25-26. After second transport (150) is scanned, steps 12 through 14 are performed on second transport (150) to eject it from drum (243) and onto brackets (195) and (197), etc.

The above 26 steps performed one complete cycle of operation. Those steps are repeated until printing plates for all pages of the newspaper have been made.

The aforesaid 26 steps may be performed in any of various ways. One way would be to have a push button for each step. These buttons could be depressed in the desired sequence. A second way performing the sequence is to employ a rotary stepping switch which continuously rotates and closes a circuit to perform one of said steps each time the switch advances one step.

Even if hand push buttons, or a stepping switch, is provided to control the system, some of the operations can be performed automatically. For example, circuits (2512) and (2571) automatically perform two of the 26 steps.

Another way of performing the 26 steps, in the desired sequence, is with a suitably programmed microprocessor, or other solid state device. Suitable microprocessors are described in the book entitled: "Practical Hardware Details for 8080, 8085, Z80 and 6800 Microprocessor Systems," by James W. Coffron, Prentice Hall, Inc. (1981).

I claim to have invented:
1. In a scanning system:
scanning means rotating about an axis and moving laterally along said axis,
a flexible transport,
said transport having (a) a first face for receiving the material to be scanned, and (b) a second face,
a curved inner wall,
said curved inner wall being an arc of a circle with the center of such circle being on said axis,
drive means for moving said transport to a position where the second face of the transport is contiguous with said curved inner wall and said first face is positioned to permit scanning of material on said first face by said scanning means, and
means for holding said second face against said curved inner wall, to permit accurate scanning of material on said first face.

2. In a scanning system:
scanning means rotating about an axis and moving laterally along said axis,
a flexible transport,
a surface for supporting said transport,
said transport having an upper face for receiving the material to be scanned and a lower face adapted to rest on said surface,
a curved inner wall,
said curved inner wall being an arc of a circle with the center of such circle being on said axis,
drive means for moving said transport from said surface to a position where the lower face of the transport is contiguous with said curved inner wall and said upper face is positioned to permit scanning of material on said upper face by said scanning means, said drive means including means for driving said transport from its position contiguous to said wall to a position on said surface and holding means for holding said lower face against said inner wall, to permit accurate scanning of material on said upper face.

3. In a scanning system as defined by claim 2, said surface being flat and said transport lying flat on said surface, said flexible transport being characterized by the ability to flex from its flat configuration on said surface to its curved configuration against said curved inner wall, said drive means driving said transport, from its flat configuration on said surface to a position where its lower face is contiguous with said curved inner wall, whereby the transport is positioned for scanning, said drive means also driving the flexible transport from its said curved configuration on said curved inner wall to its flat configuration on said table.

4. In a scanning system as defined in claim 3 in which said holding means includes grooves in said curved inner wall and means for applying suction to said grooves to hold the transport against said inner wall.

5. In a scanning system as defined in claim 2 including means for pushing said flexible transport toward said curved inner wall.

6. In a scanning system as defined in claim 2, said holding means comprising suction means for sucking said transport against said wall.

7. The method of moving a flexible sheet having upper and lower faces into a scanning device and then scanning any material on the upper face of the sheet comprising:

providing a flexible sheet that has the material to be scanned on the upper face of said sheet, positioning said sheet in a first position with said upper face facing upwardly, providing said scanning device with a curved inner wall forming an arc of a circle whose center is on a scanning axis, moving said flexible sheet from said first position, that is beyond the area scanned, to a second position where said lower face is along said inner wall, whereby said sheet is moved to a curved configuration along said inner wall, holding said sheet in said curved configuration along said inner wall, and rotating a scanning beam about said axis while translating it along said axis while said sheet is being held in said curved position, to thereby scan any material on the upper face of said sheet.

8. The method of claim 7 in which the sheet is returned from its second position that is contiguous to said inner wall, to said first position, after it has been scanned.

9. The method of claim 7 in which the flexible sheet is pushed in order to effect at least a portion of the movement from said first position to said second position.

10. In a scanning system:

scanning means rotating about an axis and moving along that axis, a flexible transport having upper and lower faces with the upper face being adapted to support the material to be scanned, first and second parallel spaced discs, rotable about an axis, for receiving the front edge of the flexible transport and winding it onto said discs, with said upper face facing said axis, a curved inner wall for said scanning system, said curved inner wall having a center line that is along the said axis of said discs, and means operable to transfer the support for said transport from said discs to said curved inner wall, said curved inner wall having means for holding the lower face of the transport contiguous with said curved inner wall after the support of the transport has been transferred to said curved inner wall, said scanning means being positioned to scan material mounted on said first face.

11. The method of moving sheet material to be scanned into a scanning device and scanning the material, comprising providing a flexible transport having upper and lower faces, attaching the material to be scanned on the upper face of said transport, positioning said transport in a flat position adjacent said scanning device with said upper face facing upwardly, providing said scanning device with an inner wall having a cross-section perpendicular to a given axis, which is a given arc of a circle whose center is on said axis, moving said transport and said material from said flat position, that is beyond the area scanned, to a curved position where said lower face is contiguous with said inner wall, holding said transport in said curved position against said inner wall, and rotating a scanning beam about said axis while translating it along said axis, to thereby scan the material on the upper face of said transport.

12. The method of claim 11 in which the transport is returned from its position that is contiguous to said inner wall, to said flat position after the material has been scanned.

13. A method of feeding a sheet to be scanned to a scanner having a location wall with an internal curved surface and a scanning beam with a rotational component of movement about the axis of the curved surface in which a flexible transport is provided, comprising: placing the sheet on the flexible transport, and moving the transport and sheet into a scanning position in which the transport is in contact with the said internal curved surface of the location wall.

14. A method as claimed in claim 13 in which the sheet is placed on the transport while the transport is flat and horizontal.

15. A method as described in claim 14 in which one side of the transport is moved into intimate contact with said curved surface and the said sheet is then scanned.

16. A method as claimed in claim 13 in which the transport is held in contact with the internal curved surface of the location wall by suction.

17. The method of utilizing (a) a scanning device having a curved inner wall conforming to the arc of a circle, the various radii thereat intersectory at an axis (b) a flexible transport having first and second sides and (c) a scanning device rotatable about and translating along said axis for scanning one side of a piece of substantially flat, flexible material, comprising:

placing the material on the first side of said transport, feeding the transport with said material into the scanning device with the second side of the flexible material moving along said inner wall until said material is in scanning position, holding the said second side of said transport substantially against the inner wall after it has reached its final position, and operating said scanning device to scan said material.

* * * * *